United States Patent [19]
Ishiguro et al.

[11] Patent Number: 5,970,261
[45] Date of Patent: Oct. 19, 1999

[54] ZOOM CAMERA, MODE SET UP DEVICE AND CONTROL METHOD FOR ZOOM CAMERA

[75] Inventors: Minoru Ishiguro; Toru Ito; Takao Umetsu; Yashuhiro Nishitani, all of Saitama; Kazuhisa Horikiri, Tokyo, all of Japan

[73] Assignees: Fuji Photo Film Co., Ltd., Kanagawa; Fuji Photo Optical Co., Ltd., Saitama, both of Japan

[21] Appl. No.: 08/927,315

[22] Filed: Sep. 11, 1997

[30] Foreign Application Priority Data

Sep. 11, 1996 [JP] Japan ................................. 8-240163
Sep. 11, 1996 [JP] Japan ................................. 8-240165

[51] Int. Cl.$^6$ ................................................. G03B 17/00
[52] U.S. Cl. ............................ 396/85; 396/299; 396/543
[58] Field of Search ................................. 396/72, 76, 82, 396/85, 297, 299, 543

[56] References Cited

U.S. PATENT DOCUMENTS

| | | | |
|---|---|---|---|
| 5,189,466 | 2/1993 | Yasukawa et al. | 396/299 |
| 5,579,069 | 11/1996 | Park | 396/72 |
| 5,589,907 | 12/1996 | Hozumi et al. | 396/287 |
| 5,682,559 | 10/1997 | Yoshino et al. | 396/121 |

*Primary Examiner*—Russell Adams
*Attorney, Agent, or Firm*—Young & Thompson

[57] ABSTRACT

A zoom camera has a push button switch that is constituted of a single disc virtually radially divided into sections, and switches disposed behind the sections one by one. The single disc is supported in a center such that the single disc tilts in a different direction when pushed at one of the sections, and returns to a horizontal state by a spring force. One of the switches is actuated to output a signal when a corresponding one of the sections is pushed. The push button switch doubles as a mode setting operation member and a zooming operation member. When the mode setting operation is designated by a manually operable switch, the signals from the switches are used for the mode setting. Otherwise, the signals from the switches are used for zooming.

27 Claims, 38 Drawing Sheets

FIG. 30
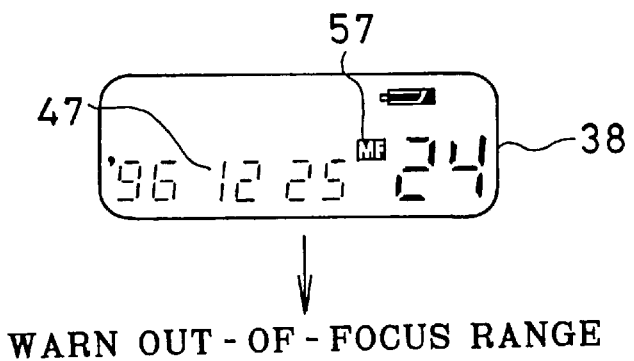
WARN OUT-OF-FOCUS RANGE
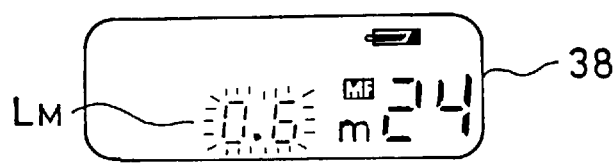
FIG. 31
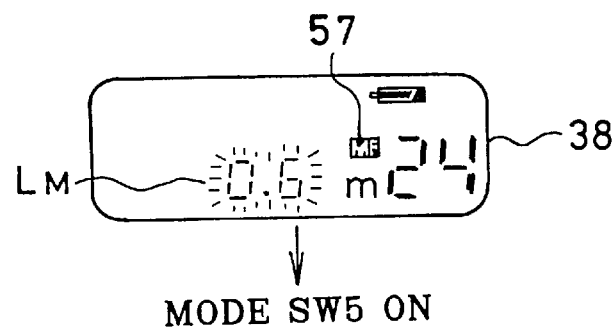
MODE SW5 ON
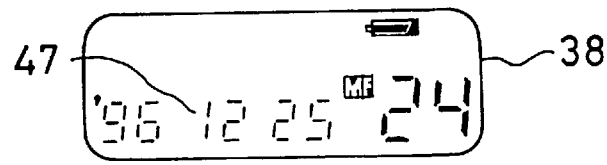
MODE SW5 OFF
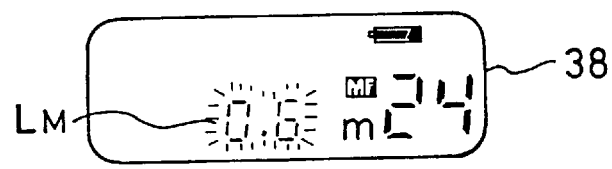

ZOOM CAMERA, MODE SET UP DEVICE AND CONTROL METHOD FOR ZOOM CAMERA

BACKGROUND OF THE INVENTION

1. Field of the Invention

The present invention relates to a zoom camera, and more particularly to a mode set up device for a campact zoom camera which is compact and has improved handling for setting a mode. The present invention also relates to a control method for the zoom camera with a manual focus mode.

2. Background Arts

Recent compact cameras often have an electric zoom lens and a variety of operation modes including different focusing modes and different flash modes. The focusing modes include an autofocus mode and a manual focus mode. The flash modes include a pre-emission mode for avoiding red-eye phenomenon and an on-flashing mode for flashing illumination light at each exposure. Most of these compact cameras are provided with operation members such as small buttons for mode setting.

In the manual focus mode, a subject distance is predetermined by the photographer, so the photographer can release the shutter the moment the aimed subject moves in that subject distance range.

As the variety of operation modes is getting wider, the number of operation members is getting larger. On the other hand, since zooming is the most frequent operation, zooming operation members should not be too small for ease of handling. To maintain a sufficiently large area or space for the zooming operation members, other mode set-up operation members have been made so small that the efficiency and handling facility in mode setting is unsatisfactory in the conventional compact zoom camera.

Moreover, as the compact zoom camera has a small size, inexpensive zoom lens system, a valid focusing range varies depending upon the focal length. Specifically, the nearest in-focus range or the shortest subject distance the lens system can be focused on changes with the focal length during zooming. Therefore, a subject distance manually selected at a particular focal length can be less than the nearest in-focus range valid for a different focal length. If the photographer releases the shutter in that condition, an exposure is made through the zoom lens system focused on the nearest in-focus range rather than the manually selected subject distance, so that a aimed main subject is taken out-of-focus.

SUMMARY OF THE INVENTION

In view of the foregoing, a prime object of the present invention is to provide a zoom camera with a mode set up device by which mode setting is easy and efficient without interfering with the handling facility of the zooming operation members.

Another object of the present invention is to provide a control method for a zoom camera having a zoom lens whose nearest in-focus range varies with changing focal length during zooming, whereby out-of-focus photographs are prevented in the above mentioned manual focus mode.

To achieve the above and other object, a zoom camera of the present invention has a mode set up device that is comprised of a push button member having a plurality of radially divided sections; switches disposed in correspondence with the radial sections, to output a signal each time the corresponding one section is pushed; and a manual operation device for designating a mode setting operation, wherein the signals from the switches are used for mode setting when the mode setting operation is designated, or for zooming when the mode setting operation is not designated.

Because the single push button member having several sections is used both for zooming and for mode setting, it saves space in comparison with the case where there are one or two zooming operation members and a plurality of separate operation members for setting various modes. Also, the photographer can operate the push button member without the need for a wide movement of the finger.

According to a preferred embodiment of the present invention, when the mode setting operation is not designated, any signal from predetermined adjoining two or more of the switches is used for zooming in one direction, and any signal from other adjoining two or more of the switches is used for zooming in the opposite direction. That is, adjoining two or more sections of the push button member are used for zooming in one or the opposite zooming direction. Therefore, a wider operation area is provided for the zooming in either direction.

A control method of the present invention for a zoom camera comprises the steps of: manually determining a focusing range which the zoom lens is expected to be focused on; detecting a present focal length of the zoom lens after each zooming operation; comparing the manually determined focusing range with a nearest in-focus range available for the present focal length of the zoom lens; and giving a warning if the manually determined focusing range is less than the nearest in-focus range.

As the warning is given, the photographer can avoid an out-of-focus photograph in the manual focus mode.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 30 is an explanatory view illustrating display conditions on the LCD panel when a manual focus range selected in the manual focus mode becomes invalid for the present focal length after a zooming;

FIG. 31 is an explanatory view illustrating display conditions on the LCD panel when a mode switch is turned on and off while the selected manual focus range is invalid for the present focal length;

DETAILED DESCRIPTION OF THE PREFERRED EMBODIMENT

Figure 1:
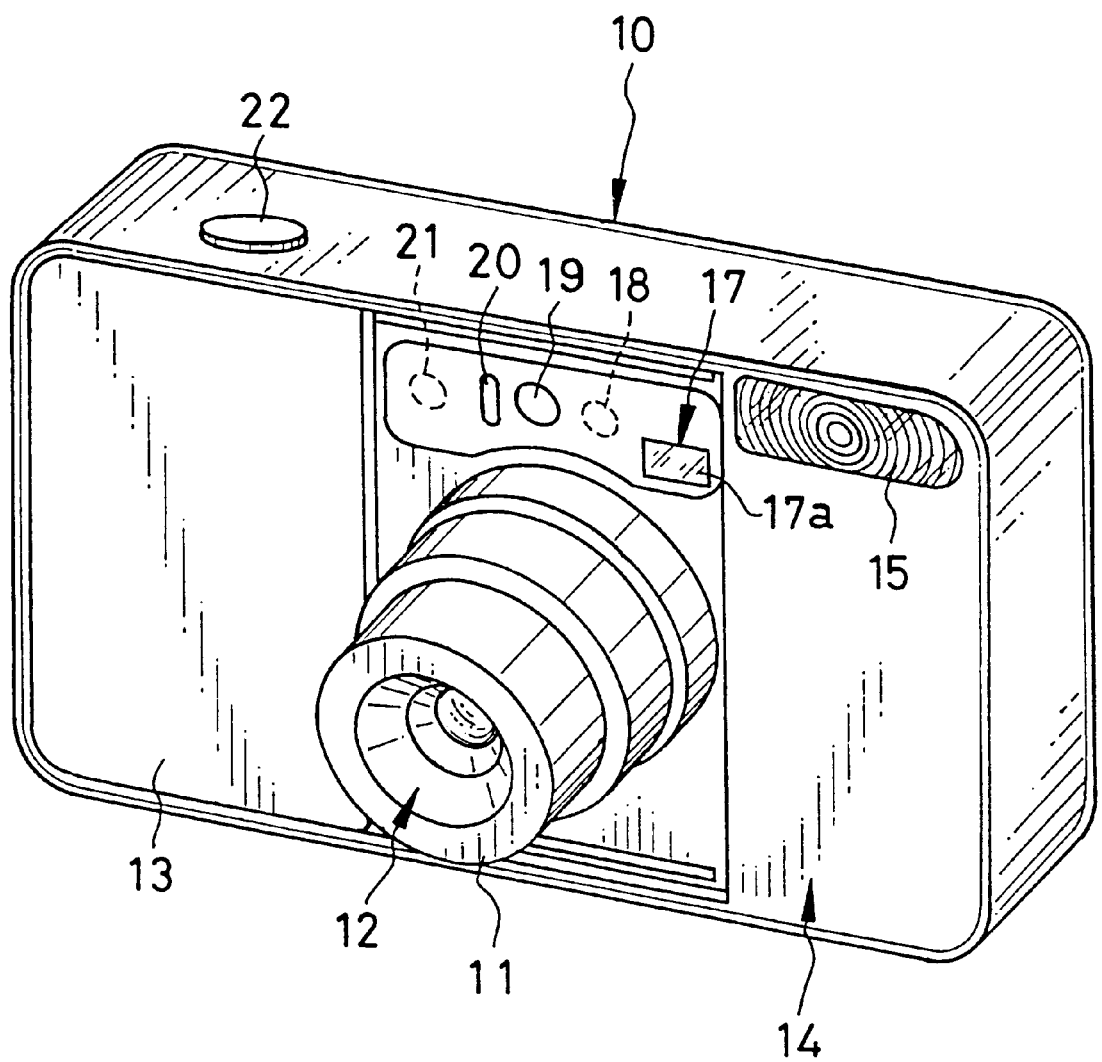
FIG. 1 is a perspective view of a compact zoom camera according to an embodiment of the invention.

In FIG. 1, a compact zoom camera 10 includes an electric zoom lens 12 whose lens barrels 11 can be completely stowed into a camera body 14. When the lens barrels 11 are stowed in the camera body, a lens barrier plate 13 is slid in front of the zoom lens 12 to close the same.

A flash projector 15 is provided in an upper front portion of the camera 10 on the opposite side of the lens barrier 13. An objective window 17a of a viewfinder 17, a light emitting section 18 for active range finding of an autofocus module 37 (see FIG. 3), a light measurement section 19 for automatic exposure control, an LED 20 for self-timer photography, and a light receiving section 21 for the active range finding are disposed above the zoom lens 12. A shutter button 22 is mounted on a top portion of the camera body 14.

Figure 2:
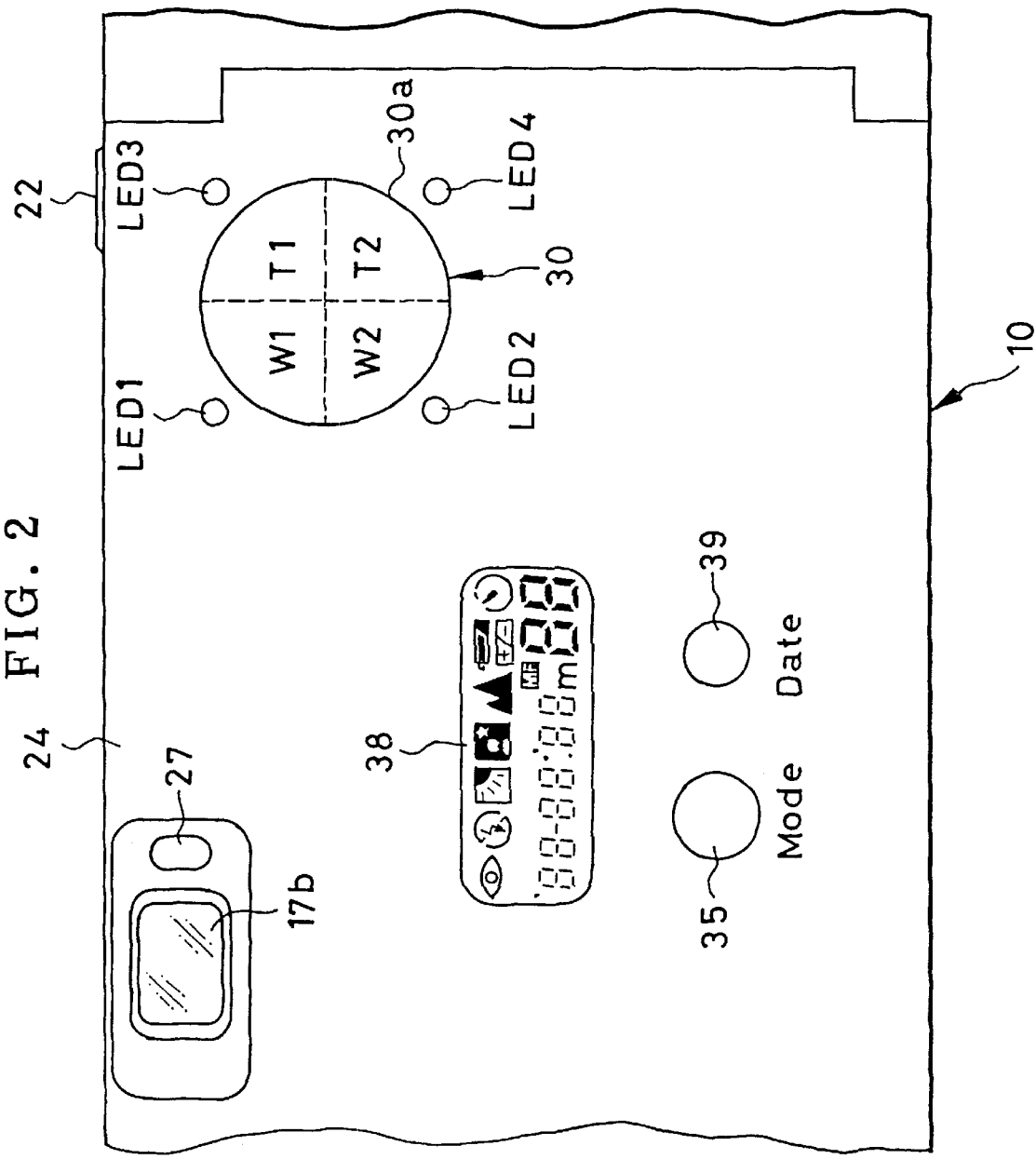
FIG. 2 is an explanatory view of a back side of the compact zoom camera of FIG. 1.

FIG. 2 shows a back side of the camera 10. An eyepiece 17b of the viewfinder 17 and an LED 27 are disposed in an upper left portion of a rear lid 24. The LED 27 is for indicating that the camera 10 is ready for exposure. A mode setting button 30 is disposed in an upper right portion of the rear lid 24 so the photographer can operate the mode setting button 30 by the right-hand thumb with ease while framing through the viewfinder 17. The mode setting button 30 is operated for zooming as well as for mode setting.

Figure 3:
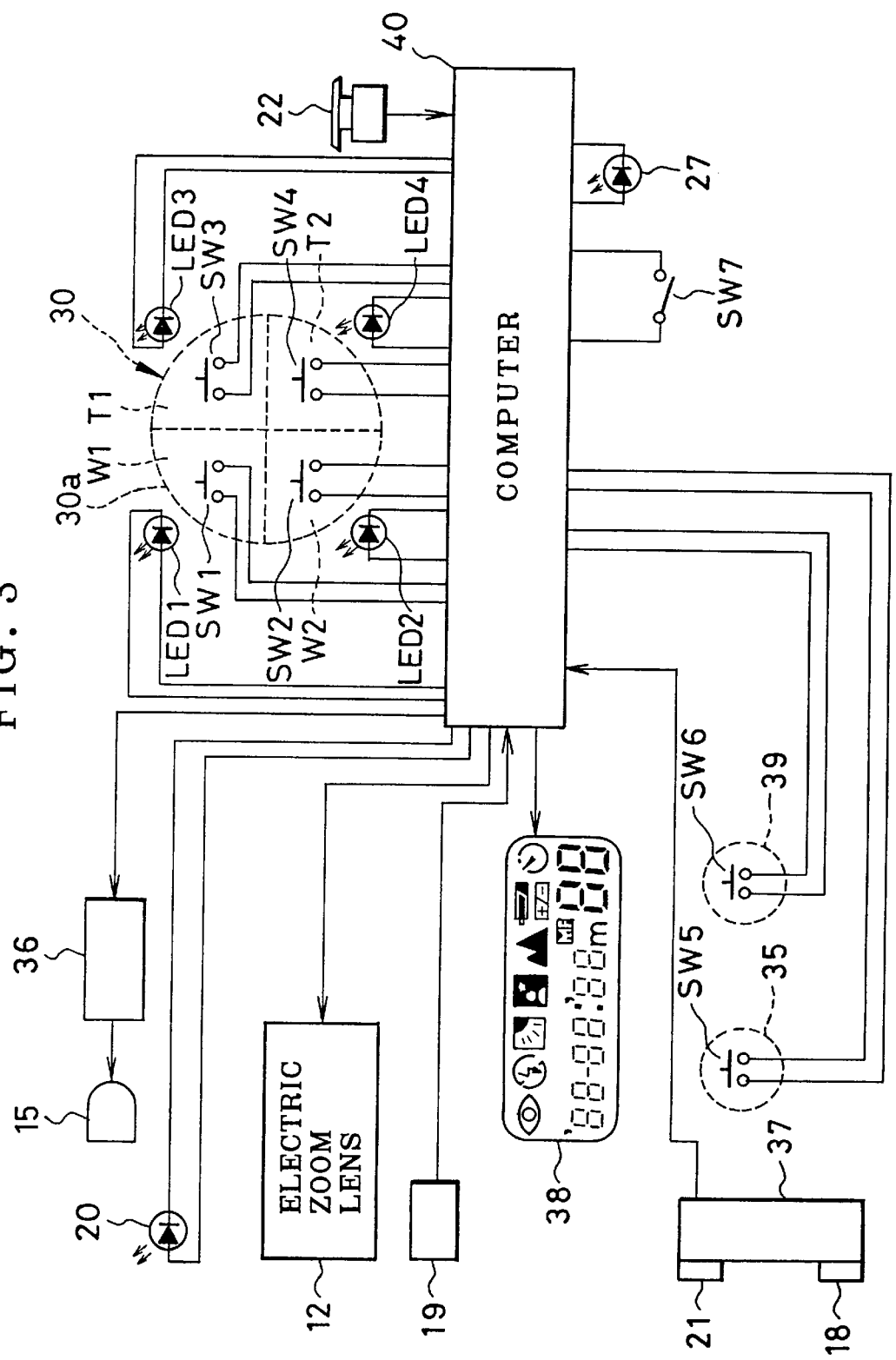
FIG. 3 is a schematic diagram illustrating electric control system of the compact zoom camera of FIG. 1.

As shown in FIG. 3, the mode setting button 30 is constituted of a round switch disc 30a and four switches SW1, SW2, SW3 and SW4. The round switch disc 30a is sectioned into quarter sectors W1, W2, T1 and T2, and the four switches SW1, SW2, SW3 and SW4 are disposed behind the sectors W1, W2, T1 and T2 respectively, so the four switches SW1, SW2, SW3 and SW4 are individually actuated by depressing the corresponding sectors W1, W2, T1 and T2.

As will be described in more detail later, the switches SW1 and SW2 disposed behind the sectors W1 and W2 are used for zooming to the wide-angle side, whereas the switches SW3 and SW4 disposed behind the sectors T1 and T2 are used for zooming to the telephoto side.

Four light emission diodes LED1, LED2, LED3 and LED4 are disposed around the mode setting button 30 in correspondence with the four sectors W1, W2, T1 and T2. The LED1 to LED4 are turned on or off in accordance with a variety of mode setting operations that are effected while depressing a mode switch button 35. The mode switch button 35 is disposed in a lower portion of the rear lid 24, as shown in FIG. 2. Concurrently with the mode setting operation, necessary information is displayed on a liquid crystal display panel 38 that is disposed above the mode switch button 35. A date switch button 39 is disposed beside the mode switch button 35. The date switch button 39 is depressed to select a date format or to adjust the date. Although the LCD panel 38 displays all potential information thereon in FIG. 2, this is not practical.

As shown in FIG. 3, a mode switch SW5 and a date switch SW6 are disposed behind the mode switch button 35 and the date switch button 39 respectively. Also a main switch SW7 for a power source of the camera 10 is disposed in proximity to the lens barrier plate 13, such that the main switch SW7 is turned on and off in cooperation with the lens barrier plate 13 being opened and closed respectively. These switches SW1 to SW7 are connected to a microcomputer 40.

To the microcomputer 40 is connected the electric zoom lens 12, the LEDs 20 and 27 and the LED1 to LED4. Also a flash device 36 having the flash projector 15, a autofocus module 37 having the light emitting section 18 and the light receiving section 21, the light measurement section 19, the shutter button 22 and the LCD panel 38 are connected to the microcomputer 40.

Now the operation of the mode setting button 30 will be described.

Figure 34:
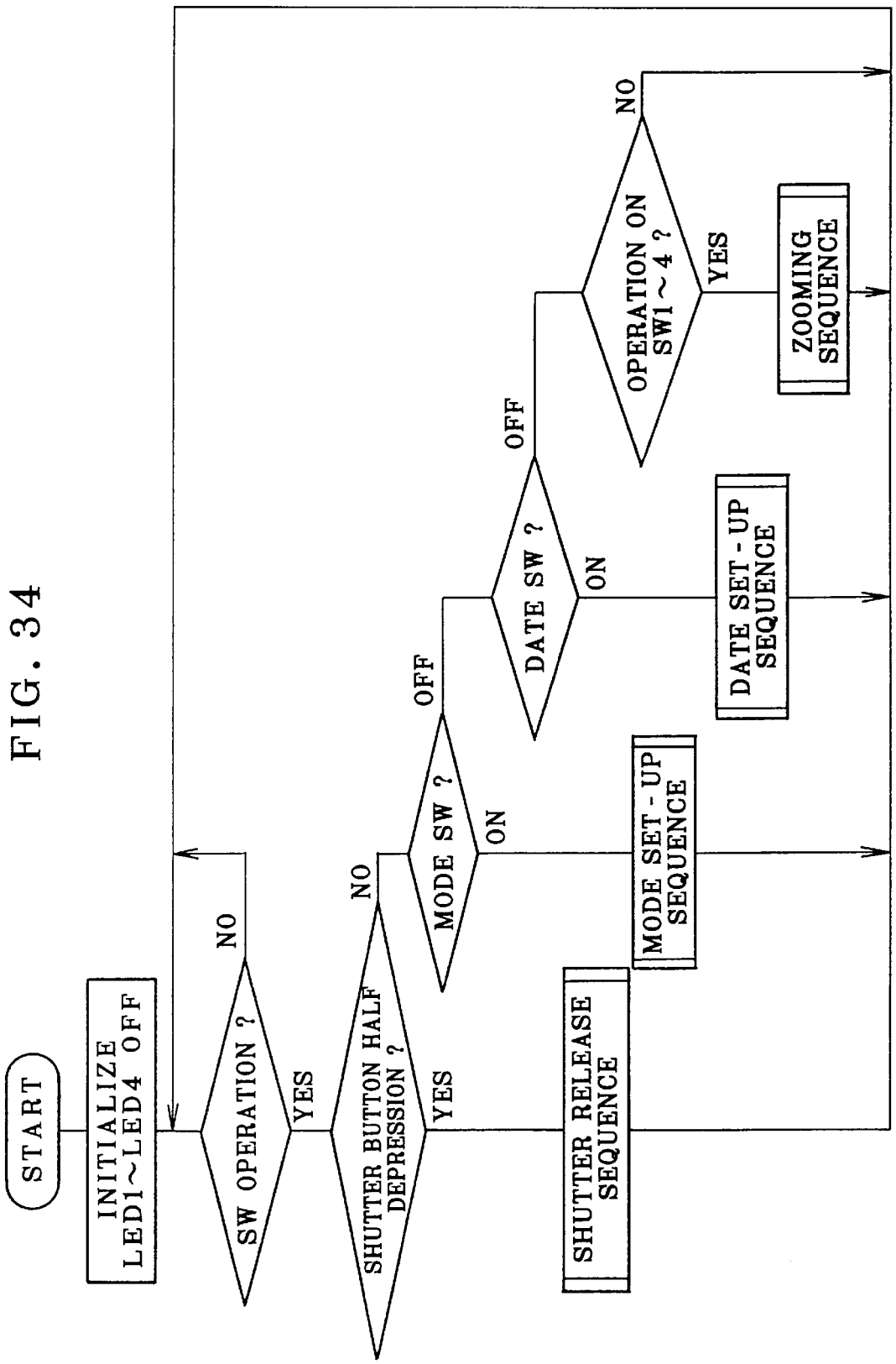
FIG. 34 is a flow chart illustrating an overall operation sequence of the electric control system of the camera.
Figure 35:
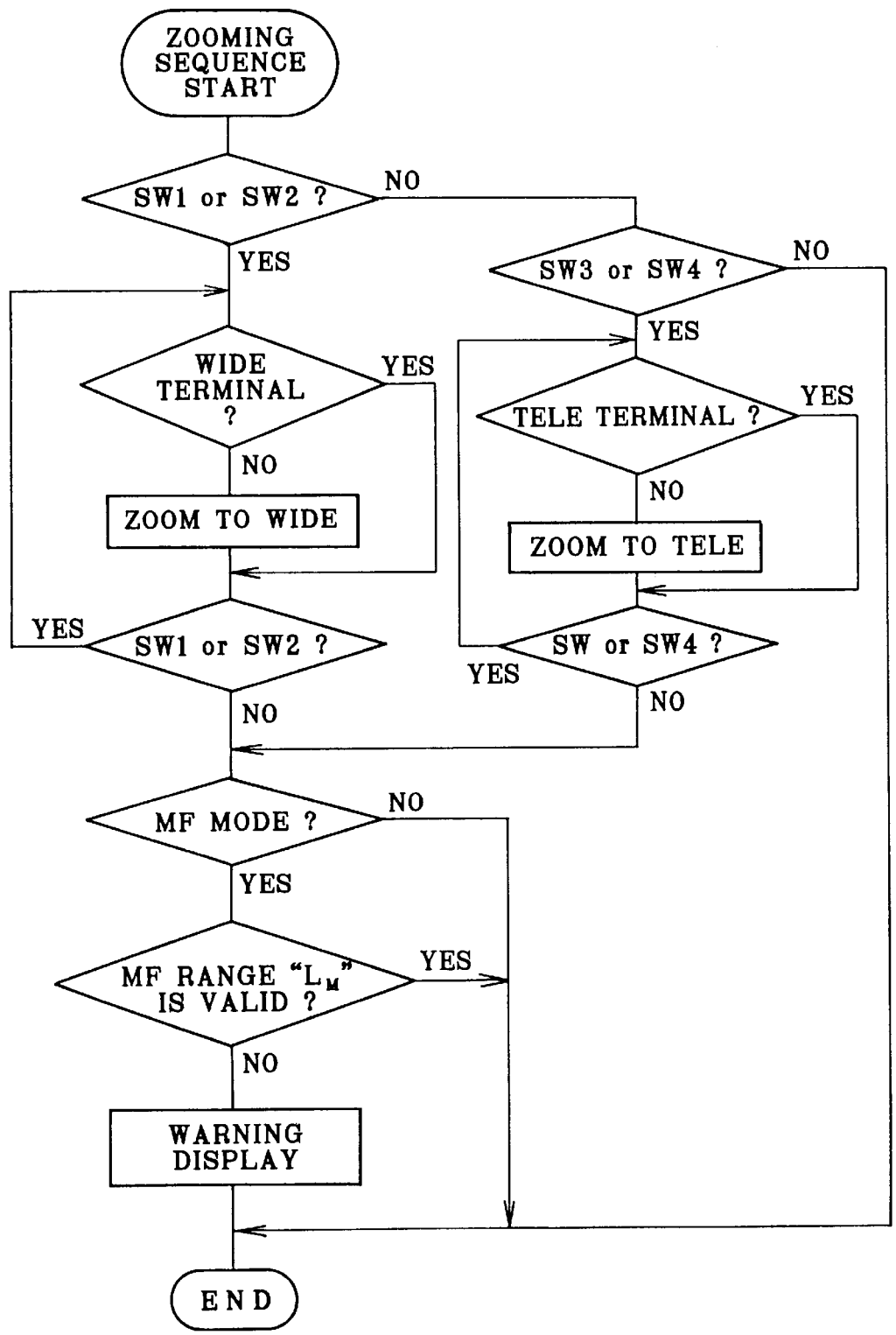
FIG. 35 is a flow chart of a zooming sequence continued from the flow chart of FIG. 34.

When the lens barrier plate 13 is opened, the main switch SW7 is turned on to supply all the electricity of the camera. In this initial stage, all of LED1 to LED4 are in the OFF state. As shown in FIG. 34, unless the mode switch button 35 or the date switch button 39 is depressed, all the LED1 to LED4 are not turned on, and the mode setting button 30 is used for zooming. According to the zooming sequence as shown in FIG. 35, the microcomputer 40 causes the zoom lens 12 to zoom toward a wide-angle terminal when at least one of the switches SW1 and SW2 is turned on, or toward a telephoto terminal when at least one of the switches SW3 and SW4 is turned on. If a manual focus range LM is selected before the zooming, and the zoom lens 12 cannot be focused on the manual focus range LM at the present zooming position, a warning display appears on the LCD panel 38, as will be described in more detail later.

Figure 4:
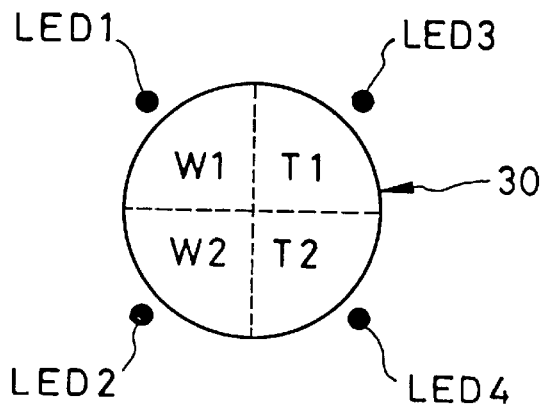
FIG. 4 is an explanatory view illustrating ON-OFF conditions of four LEDs in a mode setting standby stage, in relation to four sectors of a mode setting button.
Figure 36:
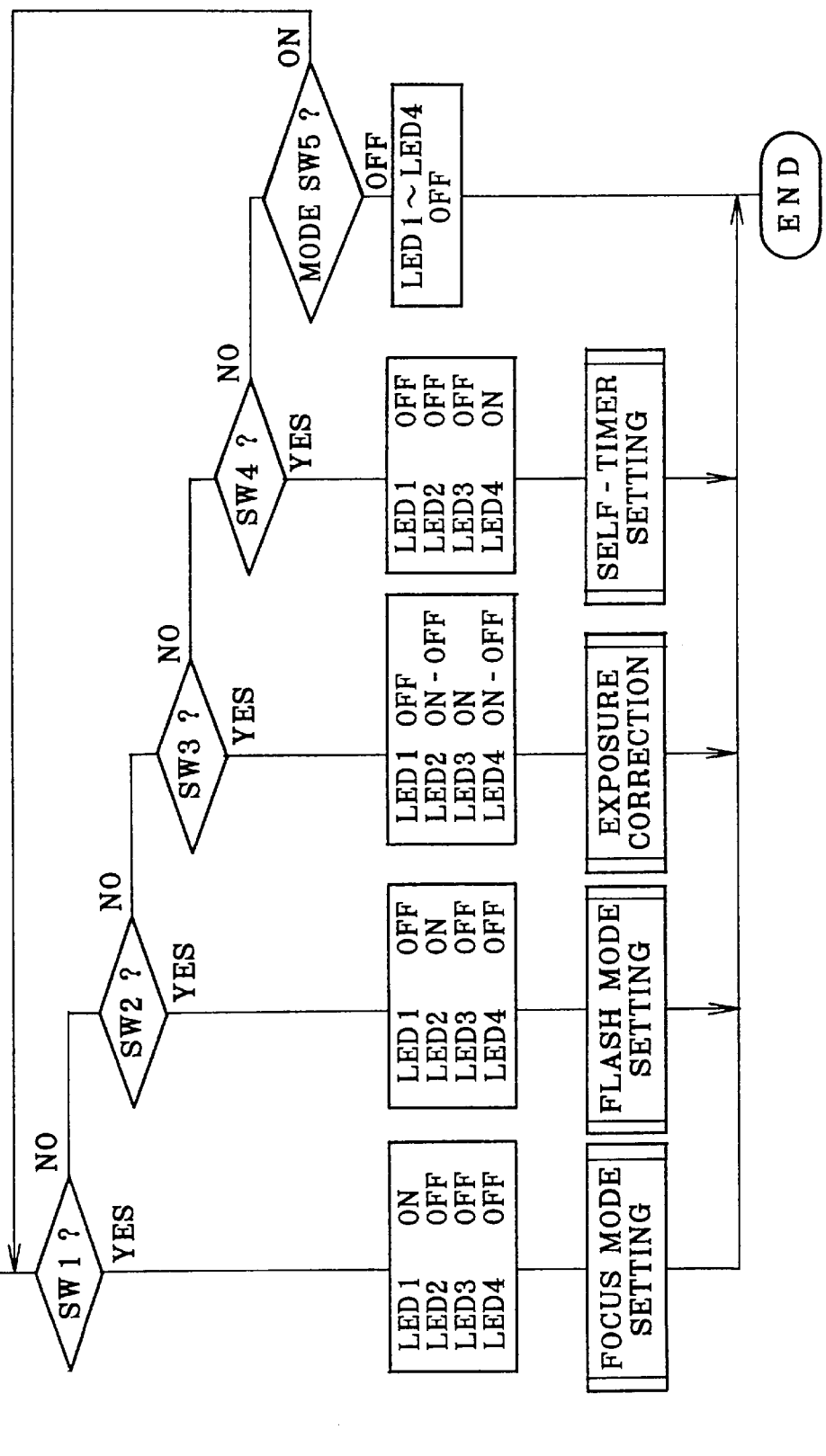
FIG. 36 is a flow chart of the mode set-up sequence continued from the flow chart of FIG. 34.

When the mode switch button 35 is depressed to turn on the switch SW5 in the above initial stage, the LED1 to LED4 are all turned on to indicate that the camera 10 moves in a mode setting standby stage, as shown in FIG. 4. In the drawings, the ON state of the LED1 to LED4 is indicated by black, and the OFF state thereof is indicated by white, whereas the ON-OFF state or blinking state is indicated by dotting. In the mode setting standby stage, the microcomputer 30 operates according to the mode set-up sequence as shown in FIG. 36.

According to the embodiment as set forth below, the mode switch button 35 should be kept depressed for keeping the camera 10 in the mode setting standby stage and in any of the following setting stages. If the photographer quits depressing the mode switch button 35, the camera 10 gets out of the mode setting standby stage or the latest setting stage, and the latest set-up condition is fixed. According to this embodiment, the mode switch SW5 is maintained in the ON stage while the mode switch button 35 is depressed. If the photographer quits depressing the mode switch button 35, the mode switch SW5 is turned off.

Figure 5:
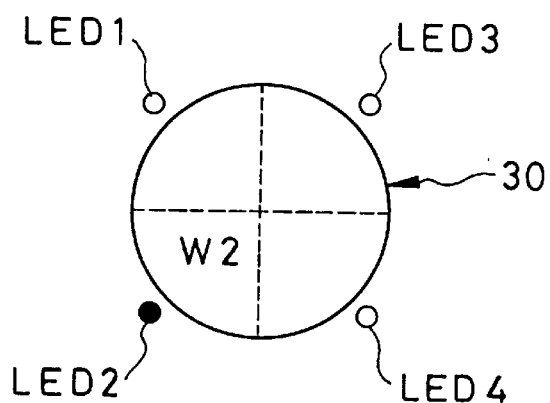
FIG. 5 is an explanatory view illustrating ON-OFF conditions of the LEDs in a flash mode setting stage.
Figure 6:
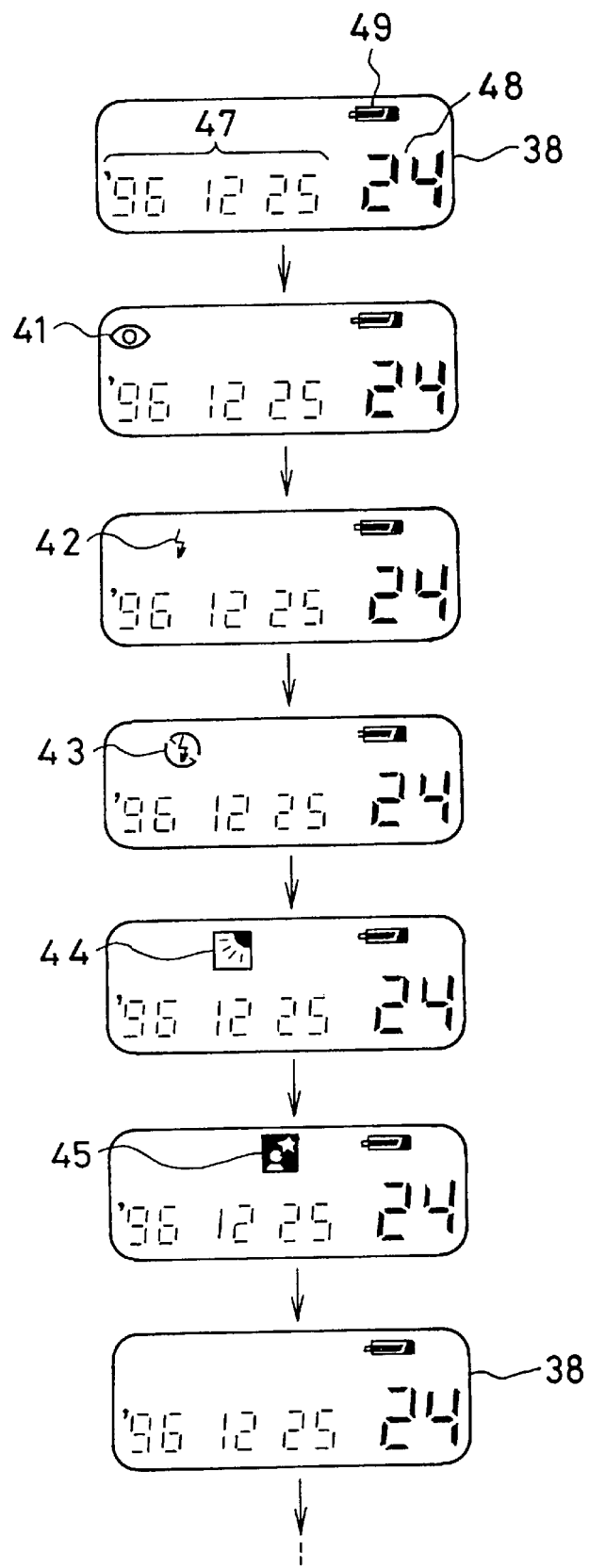
FIG. 6 is an explanatory view illustrating display conditions on an LCD panel during the flash mode setting.
Figure 37:
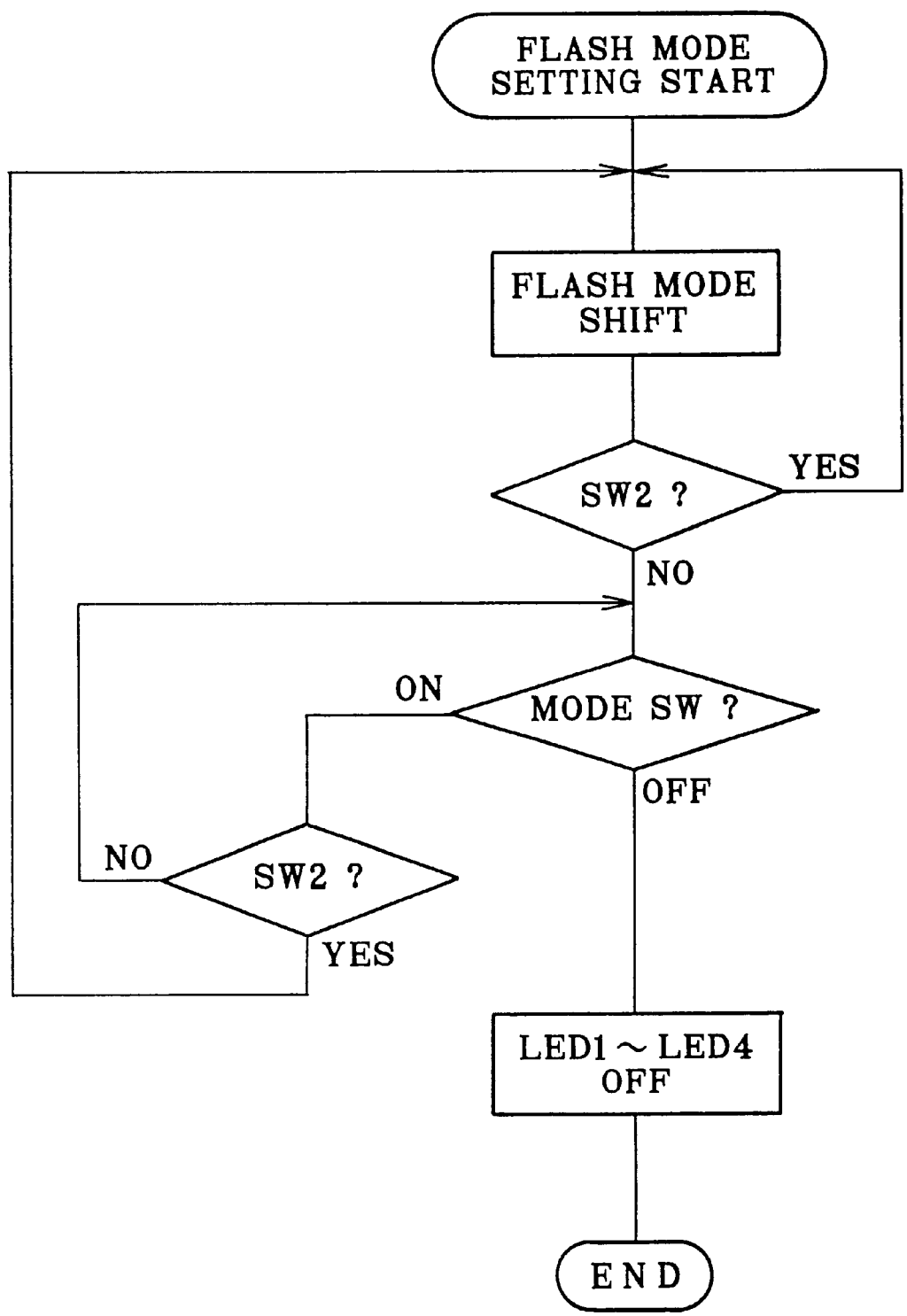
FIG. 37 is a flow chart illustrating the operation of the flash mode setting stage continued from the flow chart of FIG. 36.

If, for instance, the sector W2 is pushed to actuate the switch SW2 in the mode setting standby stage, the LED1, LED3 and LED4 are turned off, and the LED2 alone stays in the ON state, as shown in FIG. 5, indicating that the camera 10 is in a flash mode setting stage. In this stage, the microcomputer 40 operates according to the sequence as shown in FIG. 37. Each time the sector W2 is pushed, the camera 10 is shifted from one flash mode to another in a cyclic fashion, e.g. from a multi-program mode (MP) to the pre-emission mode (PRE), to the on-flashing mode (ON), to an off-flashing mode (OFF), to a back lit compensation mode (BLC), to a night scape mode, and again to the multi-program mode. As shown in FIG. 6, a mark 41, 42, 43, 44 or 45 is displayed on the LCD panel 38 in the pre-emission mode, the synchro-flash mode, the no flashing mode, the back lit compensation mode, or the night scape mode respectively. Besides the mark 41 to 45, the LCD panel 38 displays date 47, a number 48 as the number of available exposures, and a battery charge condition mark 49 during the flash mode setting stage.

The camera 10 is usually set in the multi-program mode wherein no particular mark is displayed on the LCD panel 38, and the light quantity from the flash projector 15 is automatically adjusted to the subject brightness and the subject distance. In the pre-emission mode, the flash projector 15 flashes several times immediately before the exposure to avoid the red-eye phenomenon. In the back lit compensation mode, the flash projector 15 flashes a quantity of light that is determined by a difference in brightness between a main subject and its background.

Figure 7:
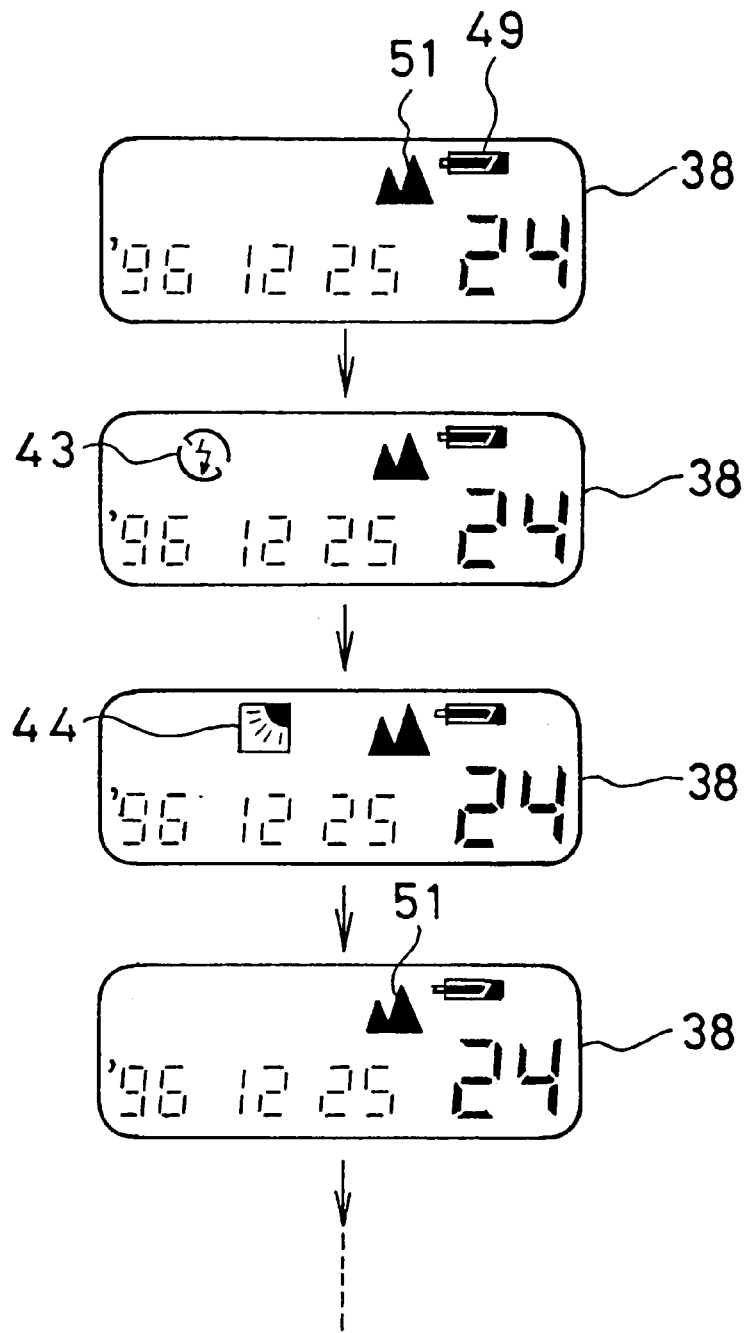
FIG. 7 is an explanatory view illustrating display conditions on the LCD panel during the flash mode setting when an infinity range is selected for focusing.

If the sector W2 is pushed to change the flash mode after the focusing range is determined to be an infinity range, the flash mode is shifted cyclically from the multi-program mode to the off-flashing mode, and then to the back lit compensation mode and again to the multi-program mode, as shown in FIG. 7. In FIG. 7, a mark 51 indicates that the zoom lens 12 is determined to be focused on the infinity range.

Figure 8:
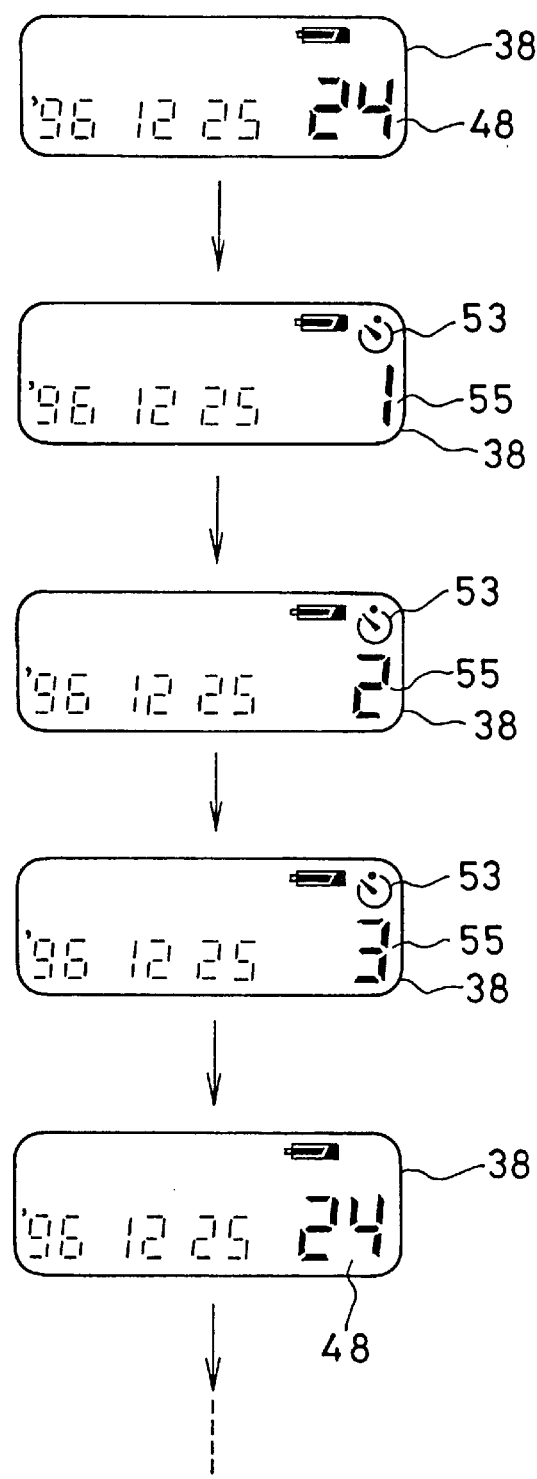
FIG. 8 is an explanatory view illustrating display conditions on the LCD panel in a self-timer setting stage.
Figure 38:
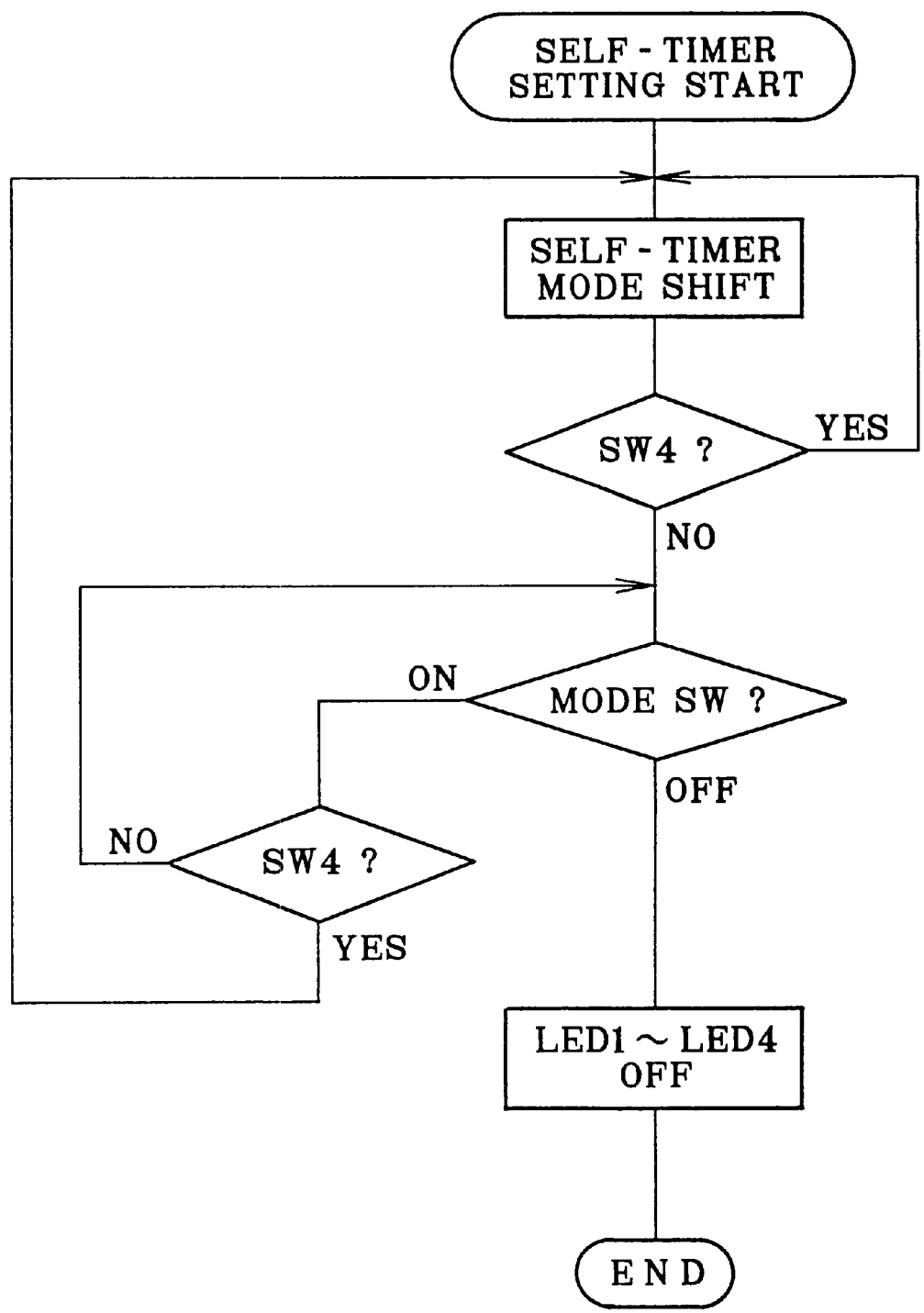
FIG. 38 is a flow chart illustrating the operation of the self-timer setting stage continued from the flow chart of FIG. 36.

If the sector T2 is pushed to actuate the switch SW4 in the mode setting standby stage shown in FIG. 4, the LED1 to LED3 are turned off, and the LED4 alone stays in the ON state, indicating that the camera 10 is set in a self-timer setting stage. In the self-timer setting stage, the microcomputer 40 operates according to the sequence as shown in FIG. 38. Each time the sector T2 is pushed, the camera 10 is shifted from a previously selected self-timer mode to a normal mode, to a first self-timer mode, to a second self-timer mode, to a third self-timer mode, and again to the normal mode in a cyclic fashion. When the camera 10 moves in the self-timer setting stage, the LCD panel 38 displays a self-timer mark 53, as shown in FIG. 8.

Figure 9:
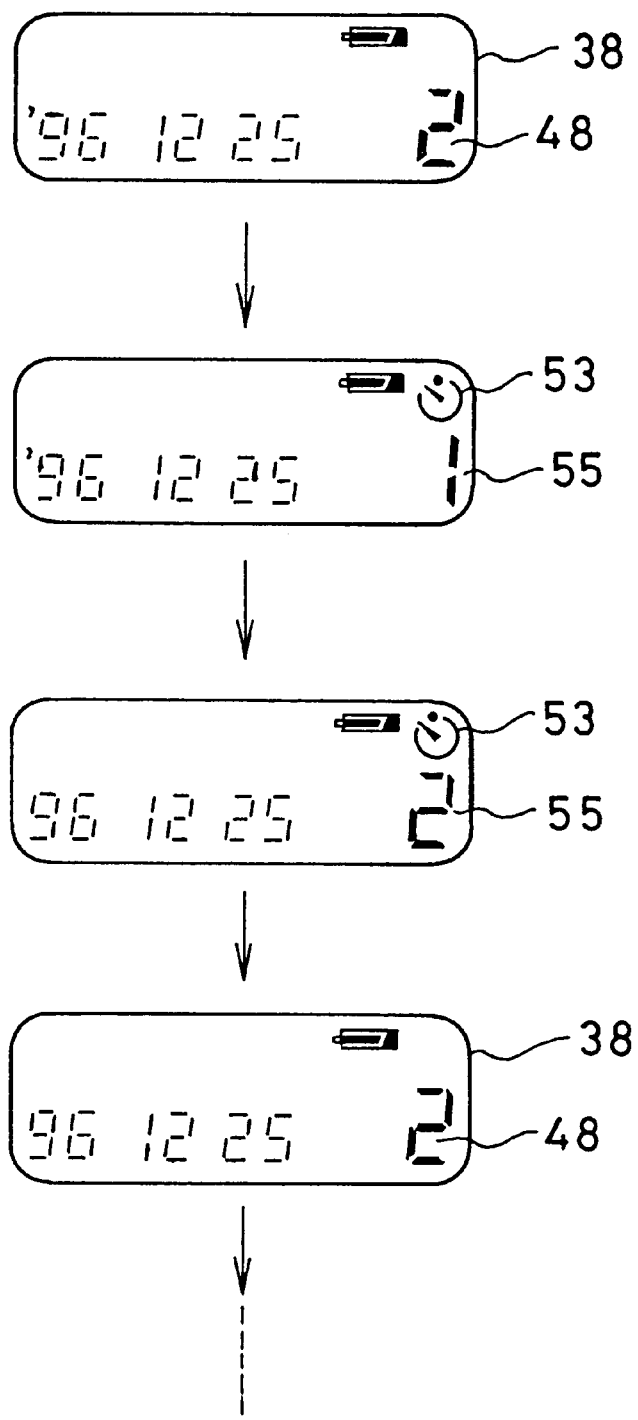
FIG. 9 is an explanatory view illustrating display conditions on the LCD panel during the self-timer setting when the number of available exposures is less than three.

In each self-timer mode, a number "1", "2" or "3" is displayed in place of the available exposure number 48, to indicate the number 55 of those frames which are being exposed automatically in succession. Specifically, in the first self-timer mode one frame is exposed, while two frames are automatically exposed sequentially in the second self-timer mode, and three frames are automatically exposed sequentially in the third self-timer mode. As the number 55 of frames exposed at one self-timer photography cannot be more than the available exposure number 48, the third self-timer mode is automatically skipped when the available exposure number is less than three, as shown in FIG. 9.

Figure 11:
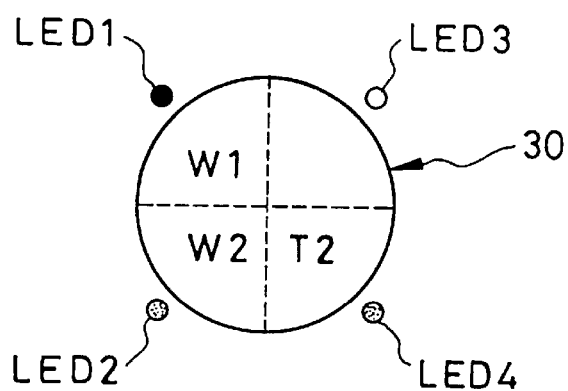
FIG. 11 is an explanatory view illustrating ON-OFF conditions of the LEDs, indicating that a manual focus range can be modified in a manual focus mode.
Figure 10:
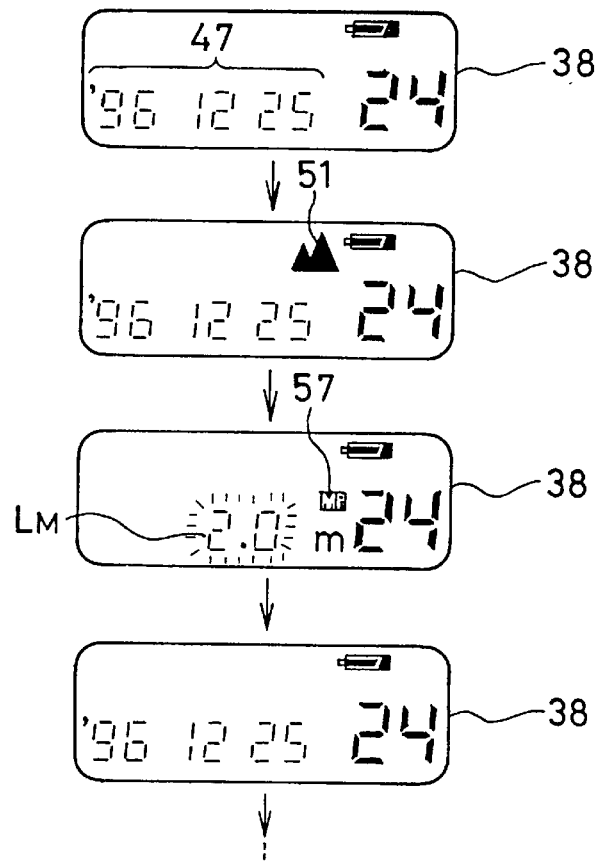
FIG. 10 is an explanatory view illustrating display conditions on the LCD panel in the focus mode setting stage.
Figure 39:
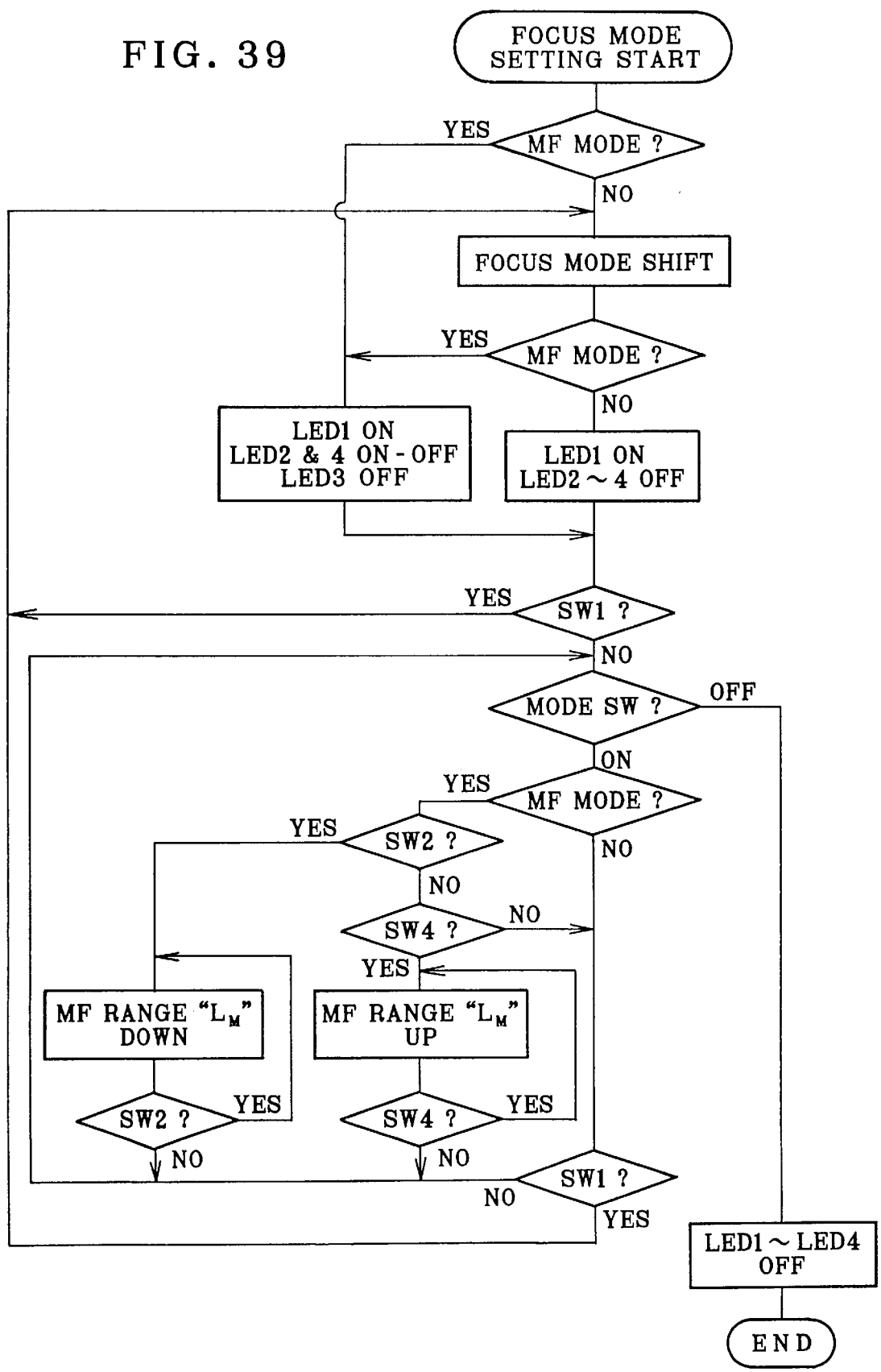
FIG. 39 is a flow chart illustrating the operation of the focus mode setting stage continued from the flow chart of FIG. 36.

If the sector W1 is pushed to actuate the switch SW1 in the mode setting standby stage, the LED2 to LED4 are turned off, and the LED1 alone stays in the ON state, indicating that the camera 10 moves in a focus mode setting stage. In the focus mode setting stage, the microcomputer 40 operates according to the sequence as shown in FIG. 39. Each time the sector W1 is pushed, the camera 10 is shifted from a presently selected focus mode to the autofocus mode (AF), to an infinity focus mode (INF), to the manual focus mode (MF), and again to the autofocus mode in a cyclic fashion. As shown in FIG. 10, the LCD panel 38 displays the mark 51 for the infinity focusing position in the infinity focus mode, or a mark 57 in the manual focus mode. When the camera 10 moves in the manual focus mode, a manually selected subject distance, e.g. "2.0 m", is also displayed in place of the date 47 in a blinking fashion. Besides that, when the camera 10 moves in the manual focus mode, the LED2 and the LED4 start emitting intermittently, i.e. start being turned on and off at a given frequency, e.g. 2 Hz, while the LED1 continues to emit, as is shown in FIG. 11. Hereinafter the manually selected subject distance will be referred to as the manual focus range $L_M$. In this instance, a default value of the manual focus range $L_M$ is 2.0 m.

The manual focus range $L_M$ is changed by depressing either of the sectors T2 and W2 of the mode setting button 30 which correspond to the blinking LED2 and LED4 in the manual focus mode. Specifically, the manual focus range $L_M$ is shifted upward or getting longer as the sector T2 is pushed to actuate the switch SW4. The manual focus range $L_M$ is shifted downward or getting shorter as the sector W2 is pushed to actuate the switch SW2. If the sector T2 or W2 continues being pushed, e.g. for 1 second or more, the manual focus range $L_M$ is shifted upward or downward at a given interval, e.g. 0.5 seconds. After the manual focus range $L_M$ reaches a maximum value, i.e. infinity ($\infty$), the microcomputer 40 responds only to the down-shifting operation through the sector W2. After the manual focus range $L_M$ reaches a minimum value, e.g. 0.8 m, the microcomputer 40 responds only to the up-shifting operation through the sector T2. It is to be noted that the minimum value of the manual focus range $L_M$ varies depending upon the focal length. That is, the minimum value of the manual focus range $L_M$ optional at each focal length is determined to be the nearest in-focus range $L_Z$ available for that focal length.

When the photographer quits depressing the mode switch button 35 to turn off the mode switch SW5 after selecting an appropriate value as the manual focus range $L_M$ by operating the mode setting button 30 in the way as set forth above, the selected value is determined to be the manual focus range $L_M$.

Figure 12:
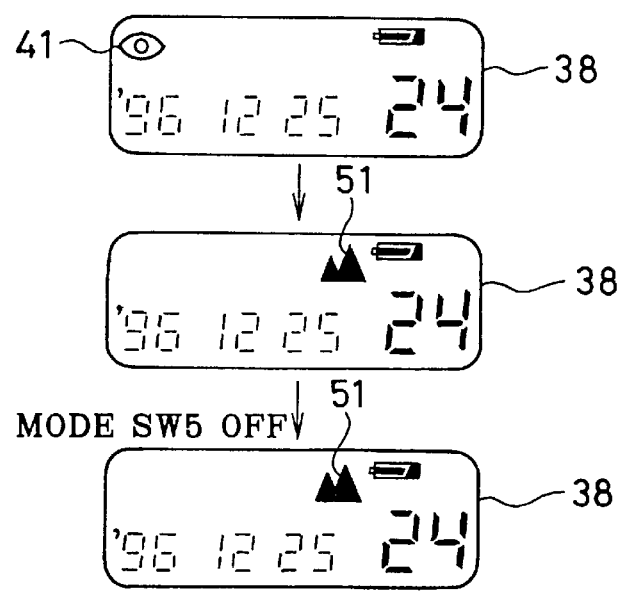
FIG. 12 is an explanatory view illustrating display conditions on the LCD panel when the infinity range is selected for focusing after a pre-emission mode is selected.
Figure 13:
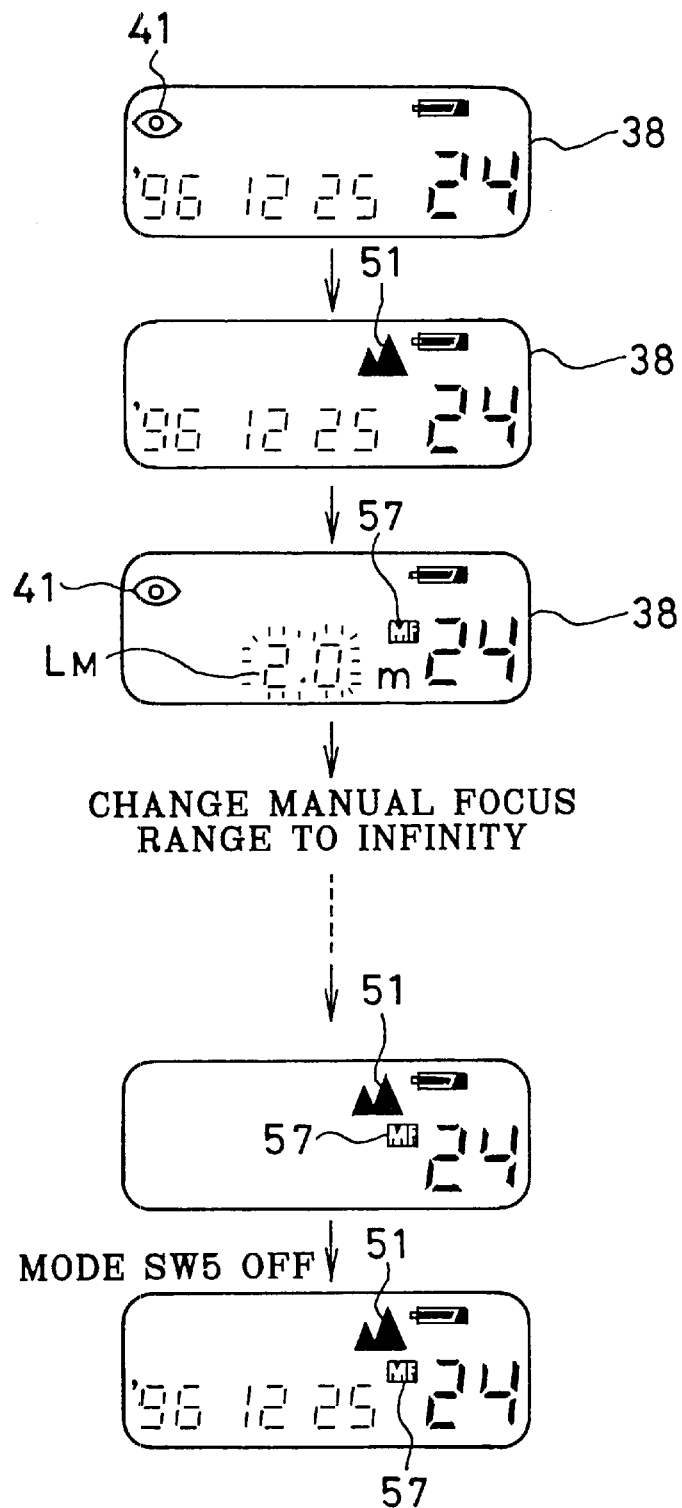
FIG. 13 is an explanatory view illustrating display conditions on the LCD panel when the infinity range is selected as the manual focus range in the manual focus mode.

If the infinity focus mode or the manual focus mode is selected when one of the pre-emission mode, the on-flashing mode and the night scape mode is selected, the flash mode is automatically reset to the multi-program mode, as shown in FIG. 12. If the focus mode setting is terminated with the infinity focus mode, or the focus mode setting is terminated after the infinity range is determined as the manual focus range $L_M$, the multi-program mode is retained. If the manual focus range $L_M$ is determined other than infinity in the manual focus mode, the flash mode returns to the previous state, e.g. the pre-emission mode, as shown in FIG. 13.

Figure 14:
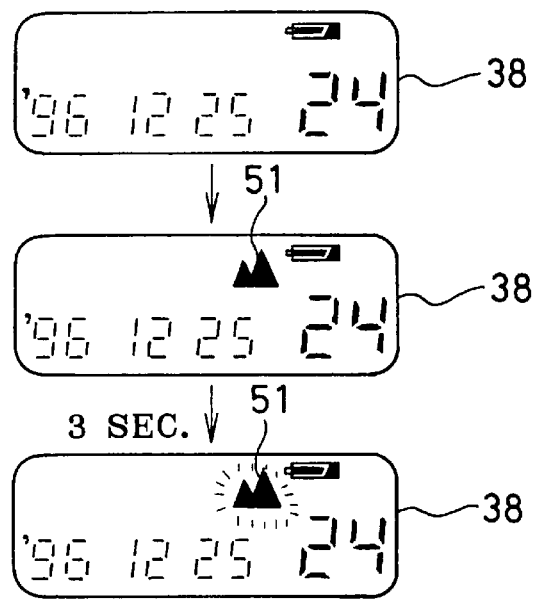
FIG. 14 is an explanatory view illustrating display conditions on the LCD panel when the infinity focus mode is latched in the focus mode setting stage.

In this embodiment, the autofocus mode is predetermined as the default flash mode, so that the camera is usually defaulted to the autofocus mode after each exposure regardless of which focus mode is previously selected. However, by depressing the sector W1 continuously for 3 seconds in the infinity focus mode or in the manual focus mode, the mark 51 or 57 on the LCD panel 38 starts blinking at the frequency of 2 Hz, as shown for example in FIG. 14, whereby the camera 10 moves in a latch mode for retaining the infinity focus mode or the manual focus mode even after the following exposures.

Once the manual focus range $L_M$ is determined, the manual focus range $L_M$ is retained unless the camera is shifted from the manual focus mode. When the camera is shifted from the manual focus mode, the manual focus range $L_M$ is initialized or defaulted to 2.0 m.

Figure 15:
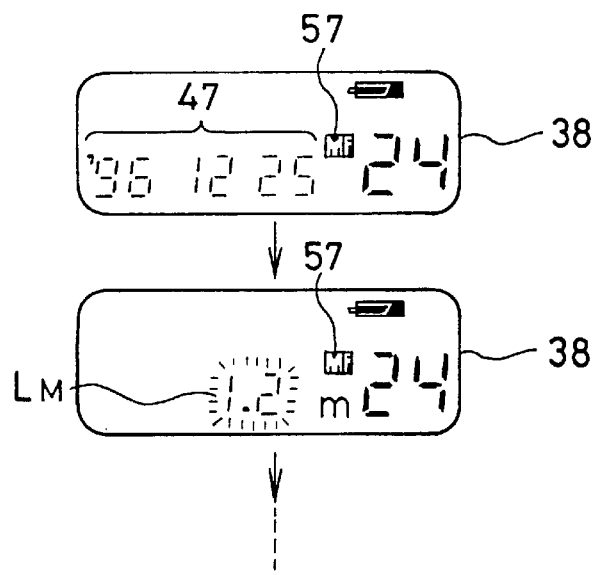
FIG. 15 is an explanatory view illustrating display conditions on the LCD panel when an operation for the focus mode setting is made in the manual focus mode.

When the sector W1 is pushed once again after the manual focus range $L_M$ is determined, the camera 10 moves in the focus mode setting stage while maintaining the manual focus mode, and the LCD panel 38 displays the presently determined manual focus range $L_M$, e.g. 1.2 m, in a blinking fashion in place of the date 47, as shown in FIG. 15. Concurrently, the LED2 and the LED 4 start blinking to indicate that the manual focus range $L_M$ is changeable by depressing the sector W2 or T2. That is, a single depression of the sector SW1 in the manual focus mode does not causes the focus mode shift, but just causes the LCD panel 38 to display the presently determined manual focus range $L_M$. Thereafter, each time the sector W1 is pushed the camera 10 is shifted from the manual focus mode to the autofocus mode, to the infinity focus mode, and again to the manual focus mode in a cyclic fashion.

Figure 16:
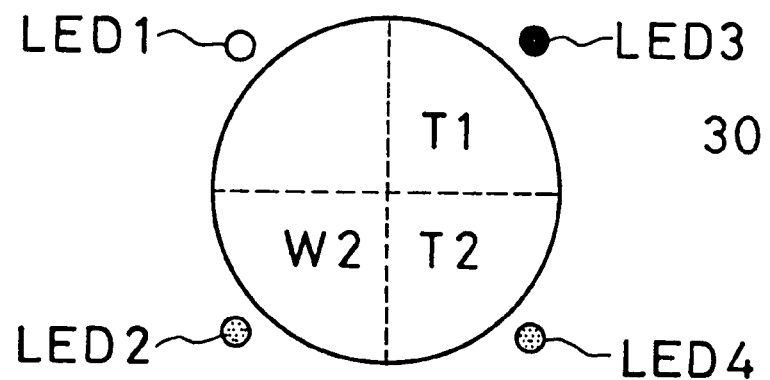
FIG. 16 is an explanatory view illustrating ON-OFF conditions of the LEDs, indicating an exposure correction mode is put on and an exposure correction value can be modified.
Figure 18:
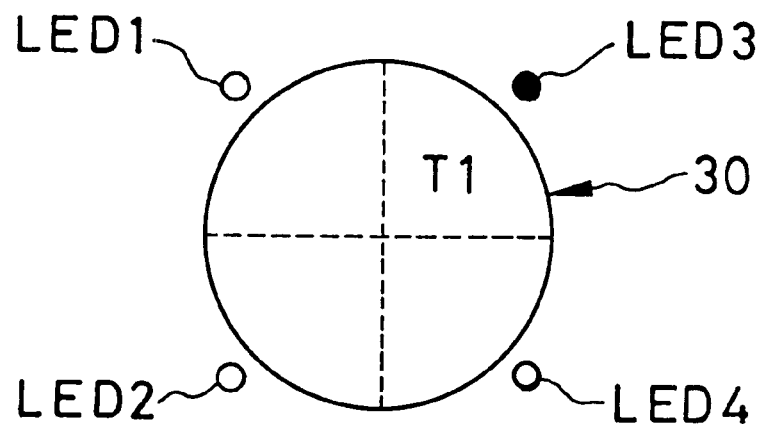
FIG. 18 is an explanatory view illustrating ON-OFF conditions of the LEDs, indicating that a manual focus mode is put off.
Figure 17:
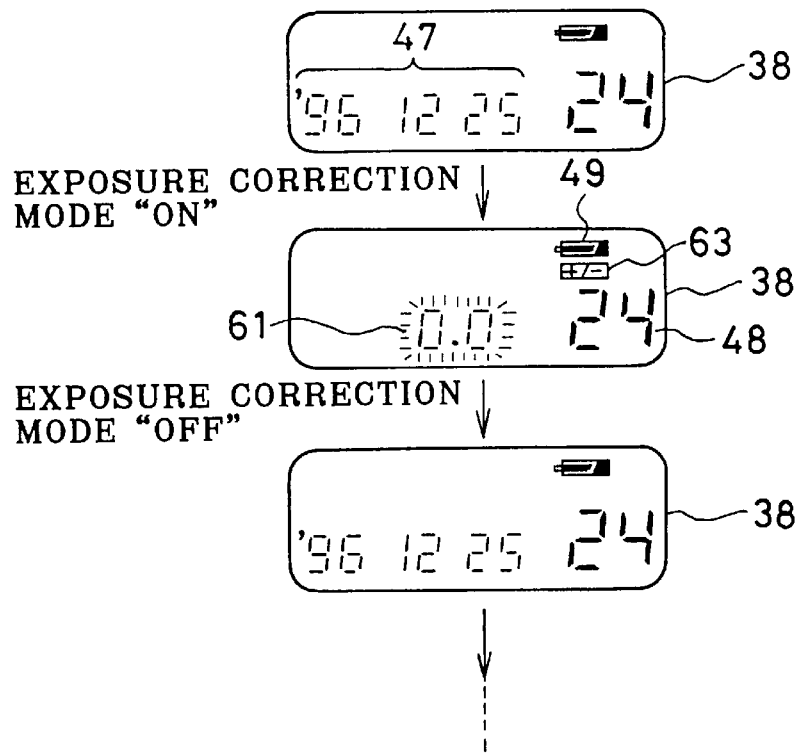
FIG. 17 is an explanatory view illustrating display conditions on the LCD panel when the exposure correction mode is put on and off without modifying the exposure correction value.
Figure 40:
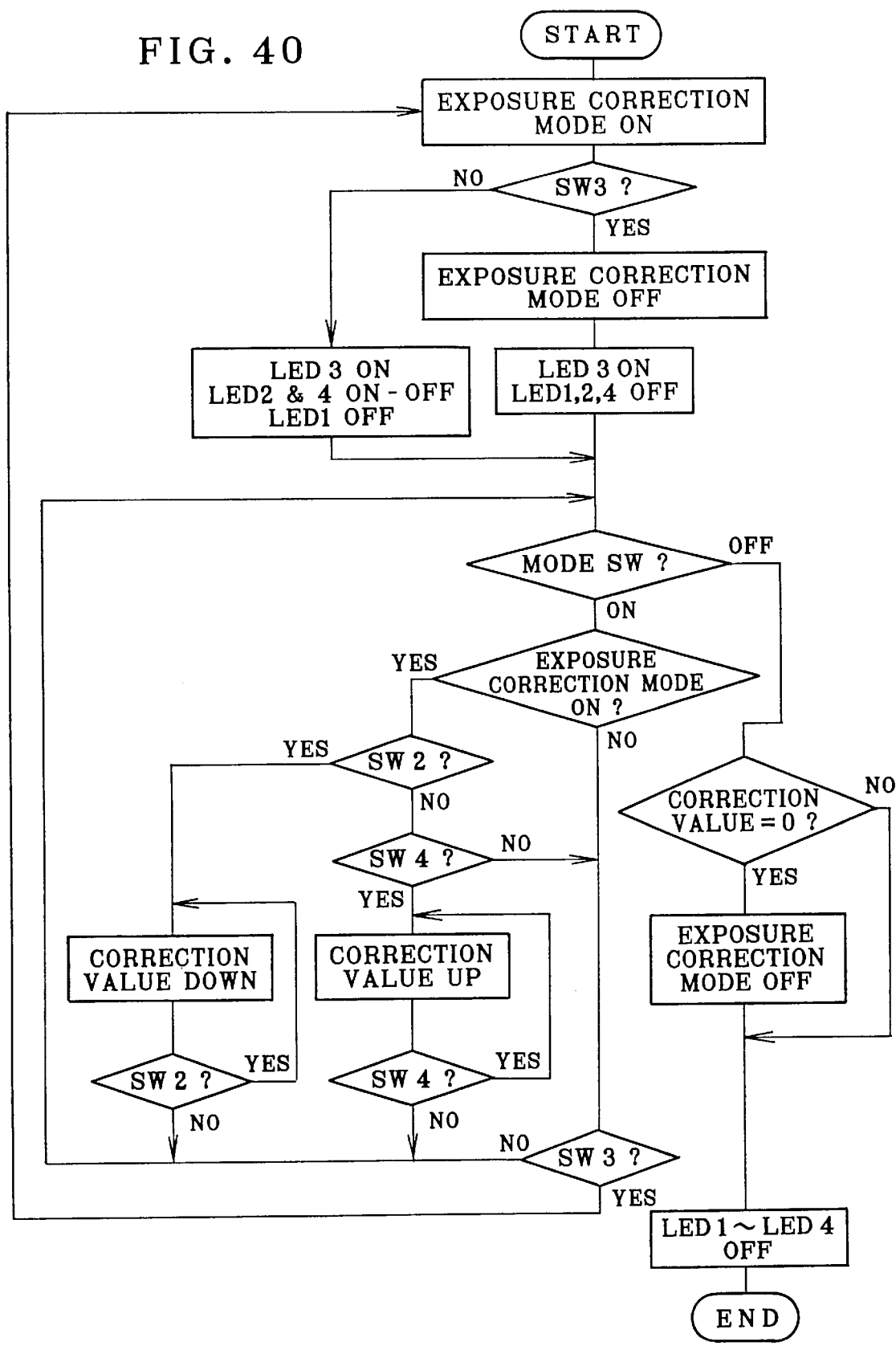
FIG. 40 is a flow chart illustrating the operation of the exposure correction mode continued from the flow chart of FIG. 36.

If the sector T1 is pushed to actuate the switch SW3 in the mode setting standby stage, the LED1 is turned off, the LED3 stays in the ON state, and the LED2 and the LED4 starts being on and off at the frequency of 2 Hz, as shown in FIG. 16. It indicates that an exposure correction mode is set on. FIG. 40 shows the operation sequence for exposure correction mode. When the camera 10 moves in the exposure correction mode, the date 47 on the LCD panel 38 is replaced by an exposure correction value 61, as shown in FIG. 17. The exposure correction value 61 is displayed in a blinking fashion to indicate that the value 61 is ready to change. When the exposure correction mode is on, a mark 63 for the exposure correction mode is also displayed between the available exposure number 48 and the battery charge condition mark 49. Upon each depression of the sector T1, the exposure correction mode being alternately set on or off, and the exposure correction value 61 or the date 47 is alternately displayed on the LCD panel 38 to indicate that the exposure correction mode is on or off, as shown in FIG. 17. When the exposure correction mode is off, only the LED3 is in ON state, and the LED2 and the LED4 are turned off, as shown in FIG. 18.

Figure 19:
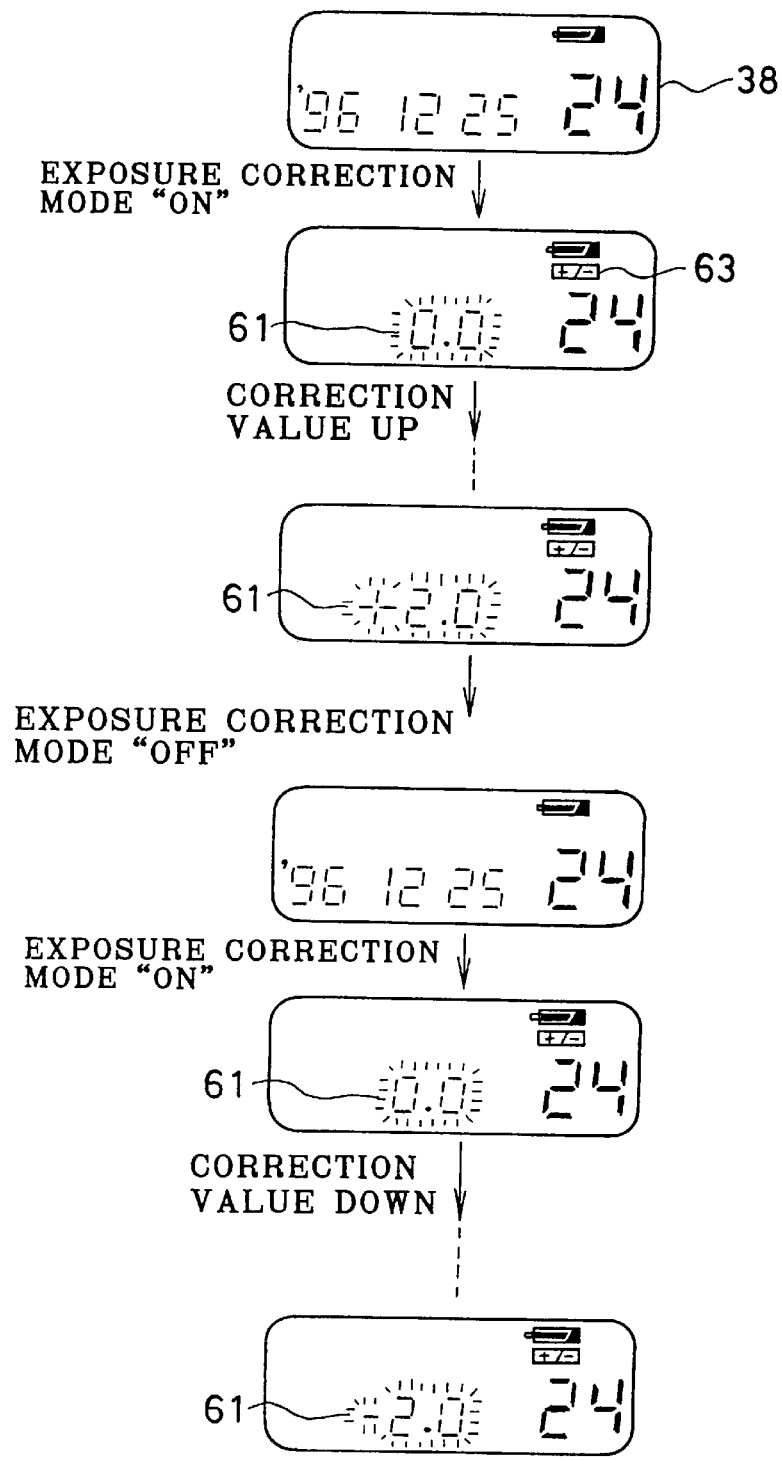
FIG. 19 is an explanatory view illustrating display conditions on the LCD panel during shifting the exposure correction value in the exposure correction mode.

To modify the exposure correction value 61, the sector T2 or W2 is pushed while the exposure correction mode is in the ON state, as shown in FIG. 16. The exposure correction value 61 is shifted upward as the sector T2 is pushed, or downward as the sector W2 is pushed, as shown in FIG. 19. In this embodiment, increment or decrement of the exposure correction value 61 is 0.5 EV, and maximum and minimum exposure correction values are +2.0 EV and –2.0 EV. Once the exposure correction value 61 is determined, the value is retained so long as the exposure correction mode is on. When the exposure correction mode is off, the exposure correction value 61 is defaulted to 0.0 EV.

Figure 20:
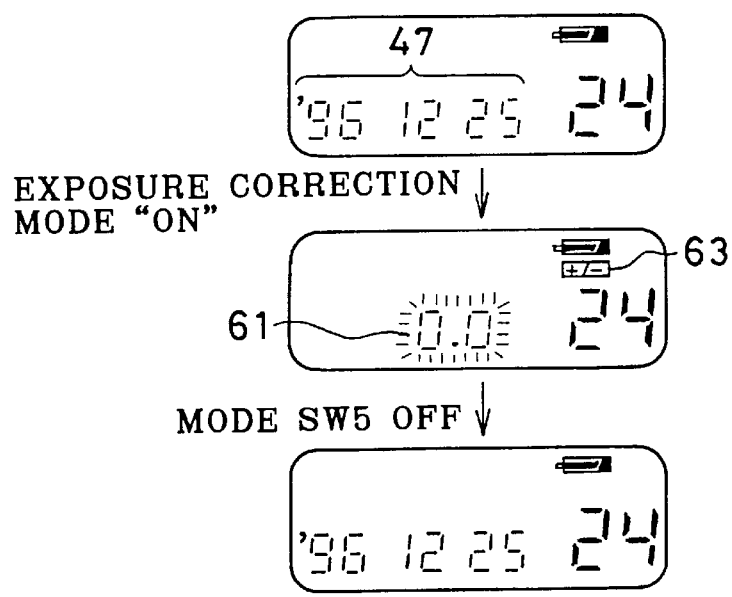
FIG. 20 is an explanatory view illustrating display conditions on the LCD panel when the exposure correction value is determined to be zero.

As shown in FIG. 20, if the photographer quits depressing the mode switch button 35 to terminate the mode setting after the exposure correction value 61 is set to 0.0 EV in the exposure correction mode, the exposure correction mode is put off.

Figure 21:
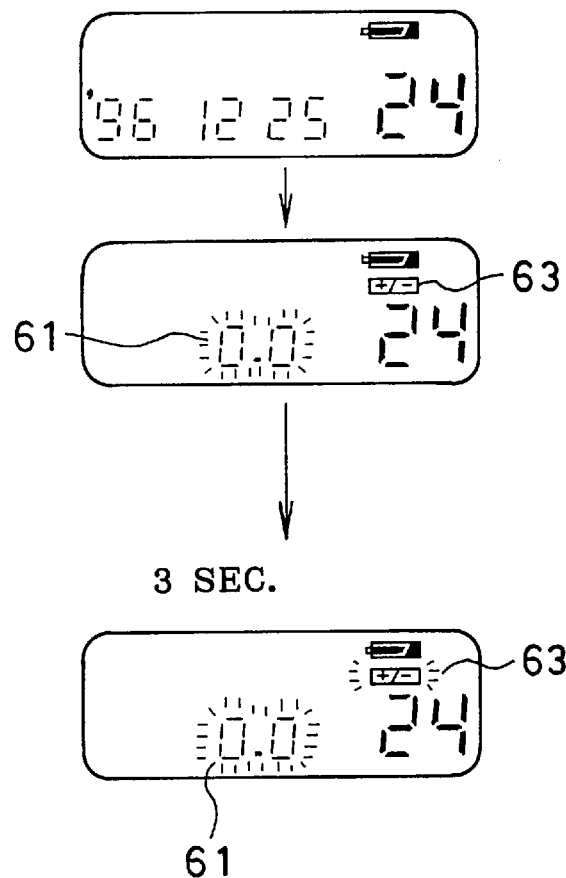
FIG. 21 is an explanatory view illustrating display conditions on the LCD panel when the exposure correction value is latched in the exposure correction mode.

As shown in FIG. 21, if the sector T1 continues being pushed for 3 seconds in the exposure correction mode, the exposure correction value 61 and the mark 63 for the exposure correction mode start blinking at the frequency of 2 Hz, whereby the determined exposure correction value 61 is latched. In that case, the determined exposure correction value 61 is not defaulted to 0.0 EV unless the main switch SW7 is turned off by closing the lens barrier plate 13. In this latched condition, the mark 63 continues being displayed in the blinking fashion after the set-up operation is terminated, but the exposure correction value 61 disappears and the date 47 appears instead.

Figure 22:
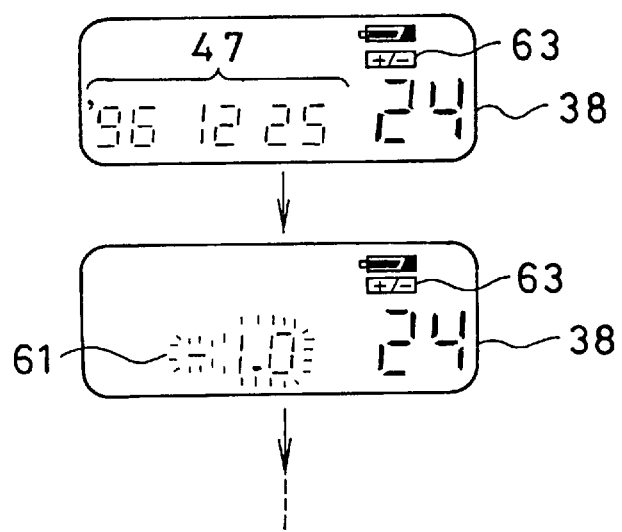
FIG. 22 is an explanatory view illustrating display conditions on the LCD panel when an operation for selecting the exposure correction mode is made while a modified exposure correction value is maintained.

When to revise the determined exposure correction value 61 while the exposure correction mode is maintained in the ON state, as shown in FIG. 22, the sector T1 is pushed, so that the present exposure correction value 61 appears in place of the date 47. Thereafter, the exposure correction mode is alternately turned on or off upon each depression of the sector T1. That is, a single depression of the sector T1 in the exposure correction mode does not turn off the exposure correction mode.

Figure 23:
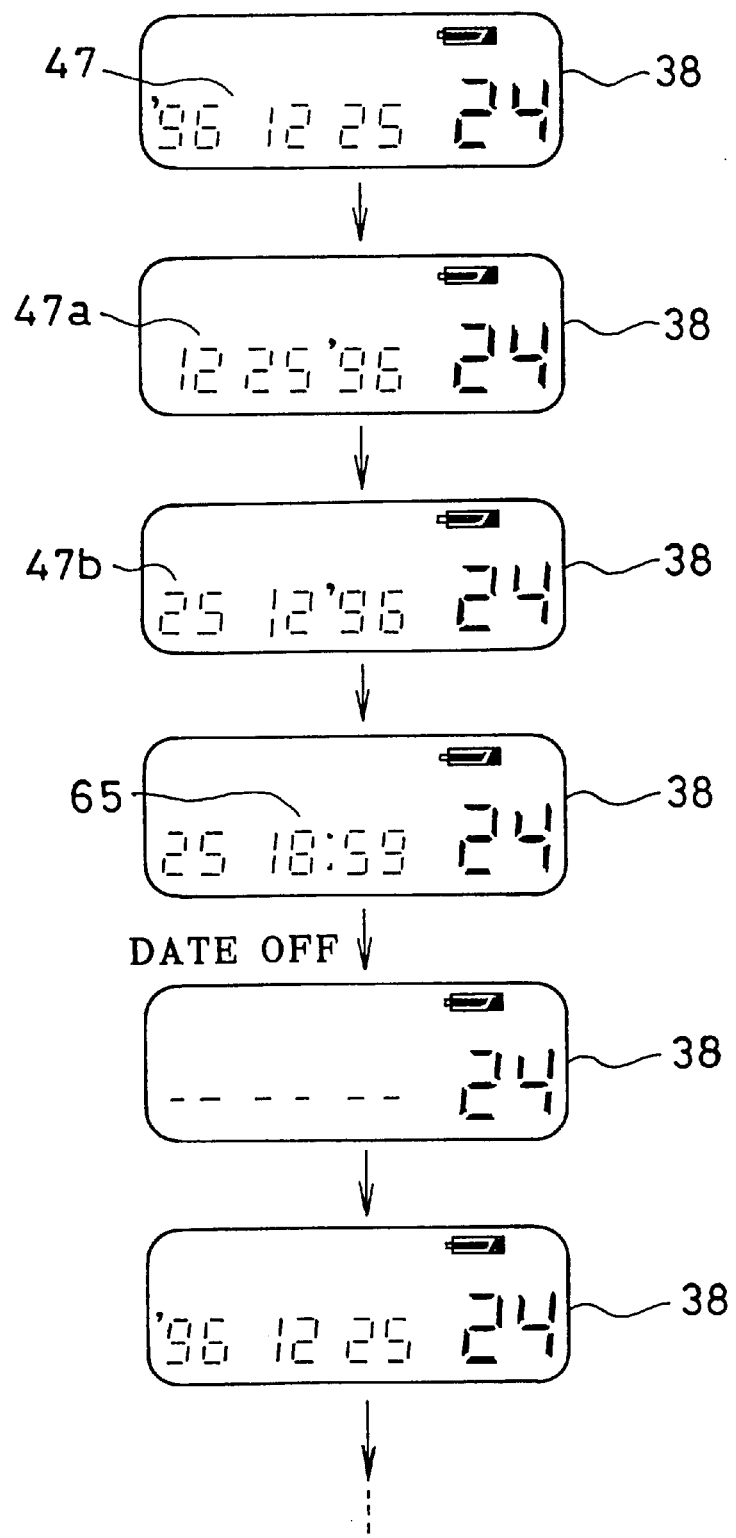
FIG. 23 is an explanatory view illustrating display conditions on the LCD panel in a date format setting mode.
Figure 41:
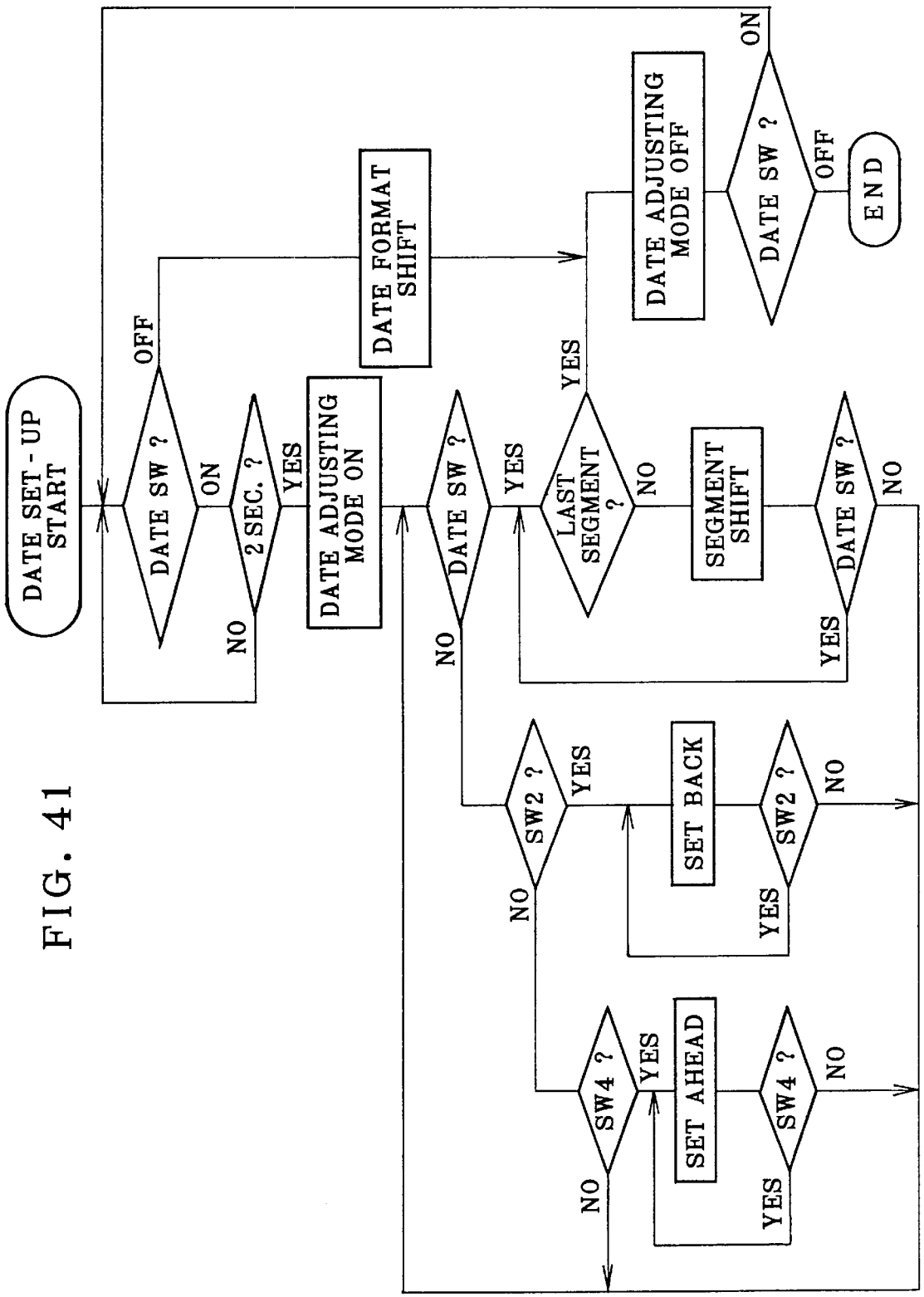
FIG. 41 is a flow chart of a date set-up sequence continued from the flow chart of FIG. 34.

On the other hand, when the date switch button 39 is depressed to turn on the date switch SW6 in the initial stage where the LED1 to LED4 are all in the OFF state, the camera 10 moves to a date set-up stage, as is shown in FIG. 34. In the date set-up stage, the microcomputer 40 operates according to the sequence as shown in FIG. 41. Each time the date switch button 39 is depressed, the display format of the date 47 on the LCD panel 38, which corresponds to the date format printed in each picture frame, is shift from one another in a cyclic fashion. As shown in FIG. 23, the date 47 is usually displayed in a default format "year/month/day", and is shifted to a "month/day/year" format 47a, to a "day/month/year" format 47b, to a "day/hour/minute" format, or to a date off format. When the day/hour/minute format is selected, a digital clock 65 is displayed on the LCD panel 38. When the date off format is selected, no date is merge-printed in the photography.

Figure 24:
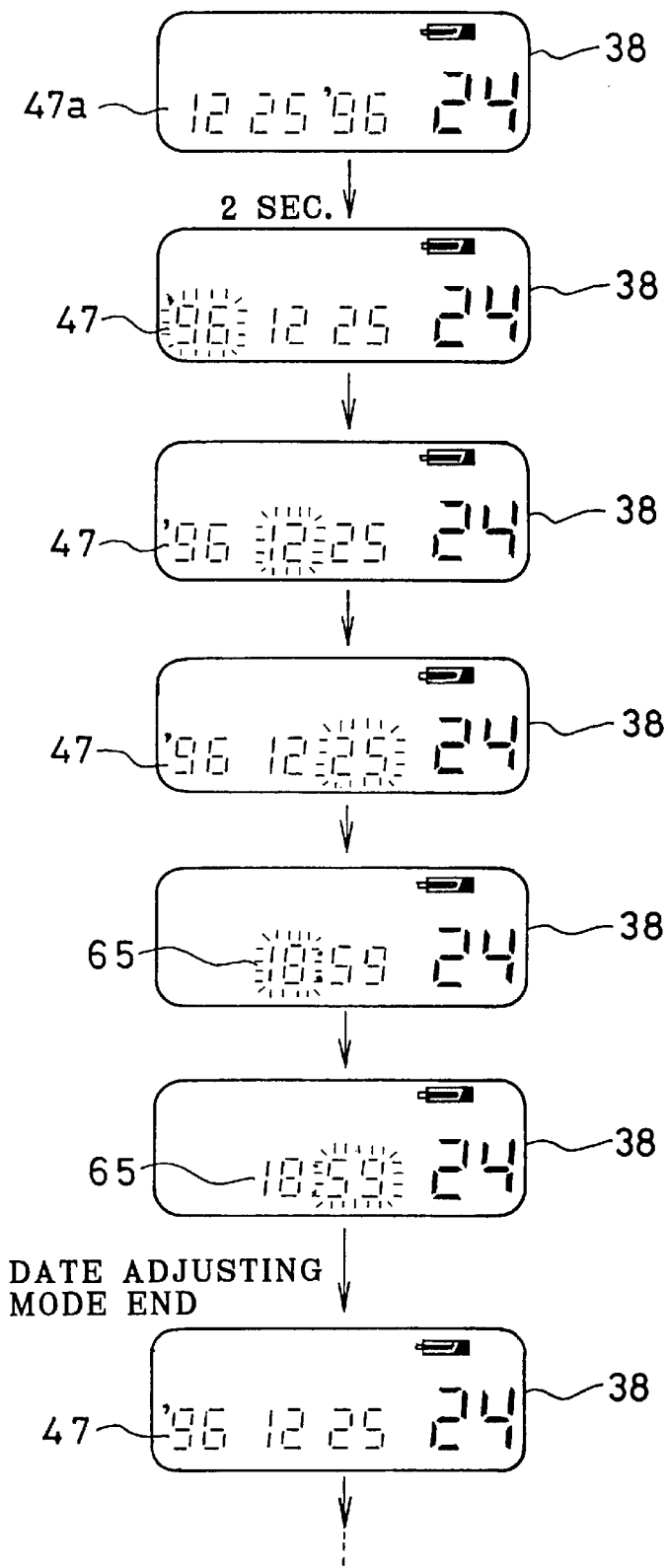
FIG. 24 is an explanatory view illustrating display conditions on the LCD panel in a date adjusting mode.
Figure 25:
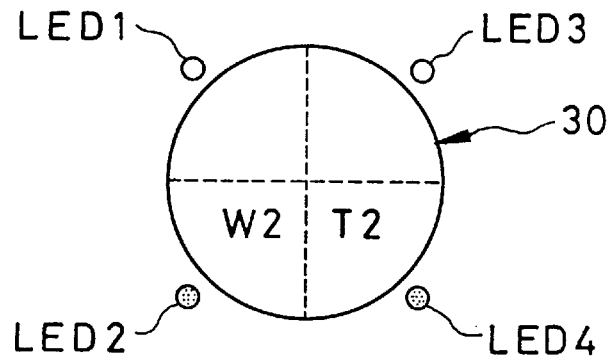
FIG. 25 is an explanatory view illustrating ON-OFF conditions of the LEDs, indicating those sectors of the mode setting button to be pushed for date adjusting.

To adjust the date 47, the date switch button 39 is depressed continuously for 2 seconds after the camera 10 moves to the date set-up stage. Then, the date 47 is defaulted to the year/month/day format and, at the same time, the year segment starts blinking at the frequency of 2 Hz, as shown in FIG. 24, to indicate a date adjusting mode. Meanwhile a built-in timer stops clocking. Thereafter, upon each depression of the date switch button 39, the blinking segment is shifted from the year to the month, to the day, to the hour, and to the minute in this sequence. One more depression of the date switch button 39 while the minute segment is blinking, the date adjusting mode is terminated, and the date 47 on the LCD panel 38 is defaulted to the month/day/year format. If no adjustment has been made for 5 minutes in the date adjusting mode, the lens barrels 11 are retracted, and all the LED1 to LED4 and the LCD panel 38 are turned off.

Figure 26:
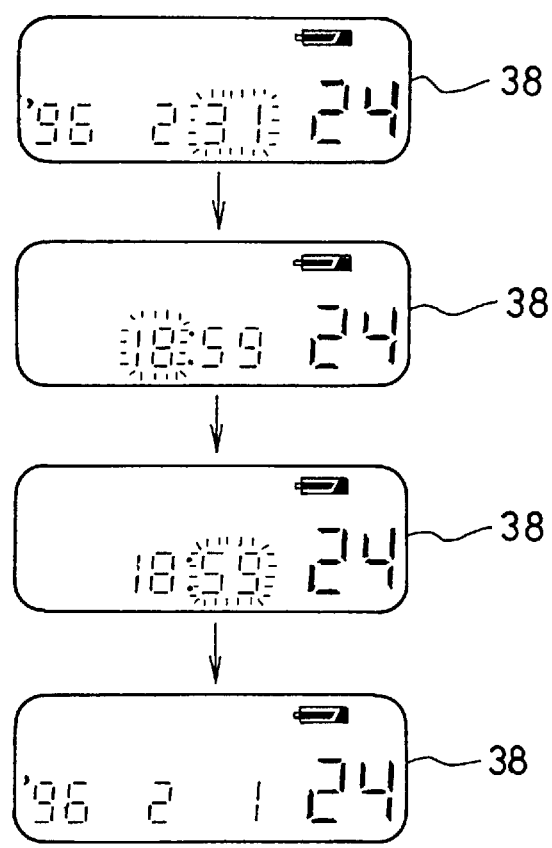
FIG. 26 is an explanatory view illustrating display conditions on the LCD panel when a nonexistent date is set up in the date adjusting mode.

During the date adjusting mode, the LED2 and the LED4 are blinking. One pushing of the sector T2 sets ahead the number in the presently blinking segment of the date 47 or that of the digital clock 65. One pushing of the sector W2 sets back the number in the presently blinking segment. Keep pushing the sector T2 or W2 for 1 second or more, and the number is set ahead or back at every 125 ms. After the number in each segment comes to an upper limit or a lower limit, which are predetermined for each segment, the number is reset to the lower limit or the upper limit respectively. For the day segment, for instance, the upper and lower limits are "31" and "1" respectively. If the date adjusting mode is finished with a nonexistent date, e.g. February 31, as shown in FIG. 26, the number in the day segment is reset to "1".

Figure 27:
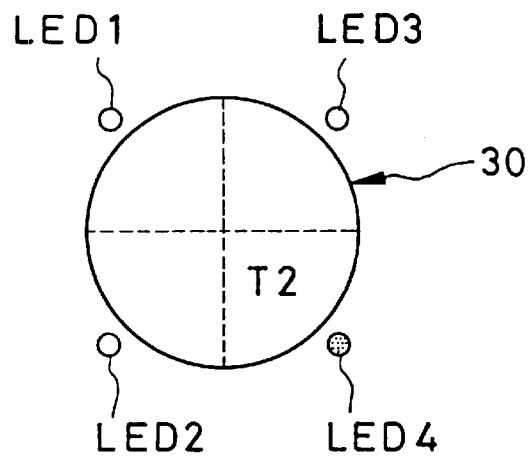
FIG. 27 is an explanatory view illustrating ON-OFF conditions of the LEDs, indicating that a self-timer starts timing.

When the shutter button 22 is fully depressed after the first or the second or the third self-timer mode is selected in the self-timer setting stage, the self-timer LED 20 is turned on, and the self-timer starts timing. Synchronously with the self-timer LED 20, the LED4 is turned on, as shown in FIG. 27. In 7 seconds after the start of timing, the self-timer LED 20 and the LED4 start blinking, and 3 seconds later, the shutter of the camera 10 is activated. To cancel the self-timer mode, the photographer closes the lens barrier plate 13 or pushes the sector T2.

Figure 42:
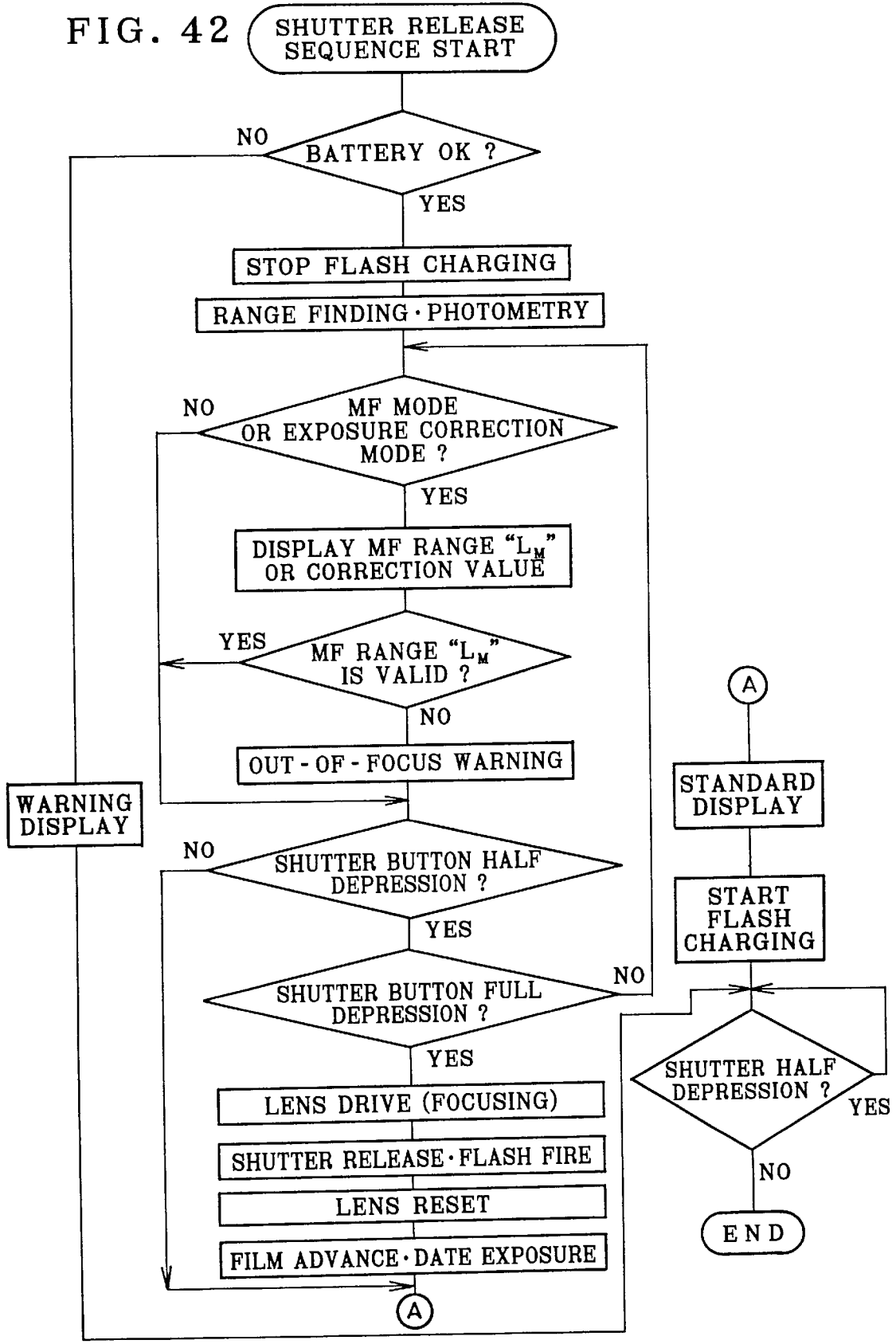
FIG. 42 is a flow chart of a shutter release sequence continued from FIG. 34.

As shown in FIG. 42, when the shutter button 22 is depressed halfway, the microcomputer 40 always checks if the charge condition of batteries as the power source of the camera 10 is sufficient. If the battery charge condition is insufficient, the shutter release is automatically interrupted, and the LCD panel 38 returns to the standard condition except but the battery charge condition mark 49 is blinking. In that case, the flash charging step at the end of the shutter release sequence is skipped.

If the battery charge condition is sufficient, the microcomputer 40 stops or inhibits charging the flash device 36, and effects the photometry and the range finding. Then, the LED 27 is turned on to indicate that the camera 10 is ready for exposure. If the exposure correction value is manually modified and/or the manual focus range L$_M$ has been determined at that time, the modified exposure correction value 61 and/or the manual focus range L$_M$ is simultaneously displayed on the LCD panel 38. If, at that time, the manual focus range L$_M$ is invalid for the present focal length, i.e. less than the nearest in-focus range L$_Z$ available for the present focal length, the manual focus range L$_M$ is displayed in the blinking fashion, and the LED 27 blinks as well, for the out-of-focus warning.

If the photographer interrupts depressing the shutter button 22, the shutter release sequence is terminated without any exposure, and the LCD panel 38 returns to the standard condition, and the flash charging is effected.

If the shutter button 22 is further depressed to the full, the zoom lens 12 is focused on an automatically determined subject range in the autofocus mode, or on the infinity in the infinity focus mode, or the manual focus range LM or the nearest in-focus range Lz in the manual focus mode. Immediately after the focusing, the shutter is released to make an exposure. At that time, the flash device 36 may be activated according to the selected flash mode. After the exposure, the zoom lens 12 is reset to an initial position that is determined for each zooming position, and then the film is advanced by one frame. During the one-frame advance of the film, the date is exposed in a portion of the exposed frame in a selected date format. The LCD panel 38 returns to the standard condition, and the flash device 36 starts being charged for the next photography.

It is alternatively possible to effect focusing in response to the half depression of the shutter button 22.

Figure 28:
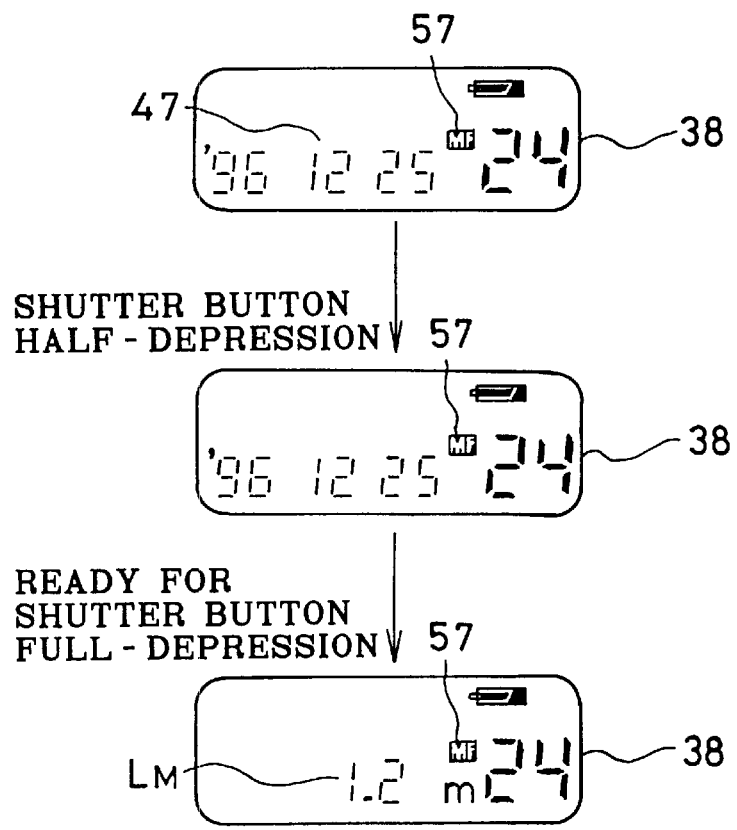
FIG. 28 is an explanatory view illustrating display conditions on the LCD panel when a shutter button is depressed halfway in the manual focus mode.

When the shutter button 22 is depressed halfway after the manual focus range LM is determined in the manual focus mode or the exposure correction value is modified in the exposure correction mode, the light measurement is effected. Thereafter, the LED 27 is turned on to emit in a continuous fashion, and the LCD panel 38 displays the manual focus range LM in a continuous fashion, as shown in FIG. 28, or the modified exposure correction value in a continuous fashion, until the photographer quits depressing the shutter button 22 or depresses the shutter button 22 fully.

Figure 29:
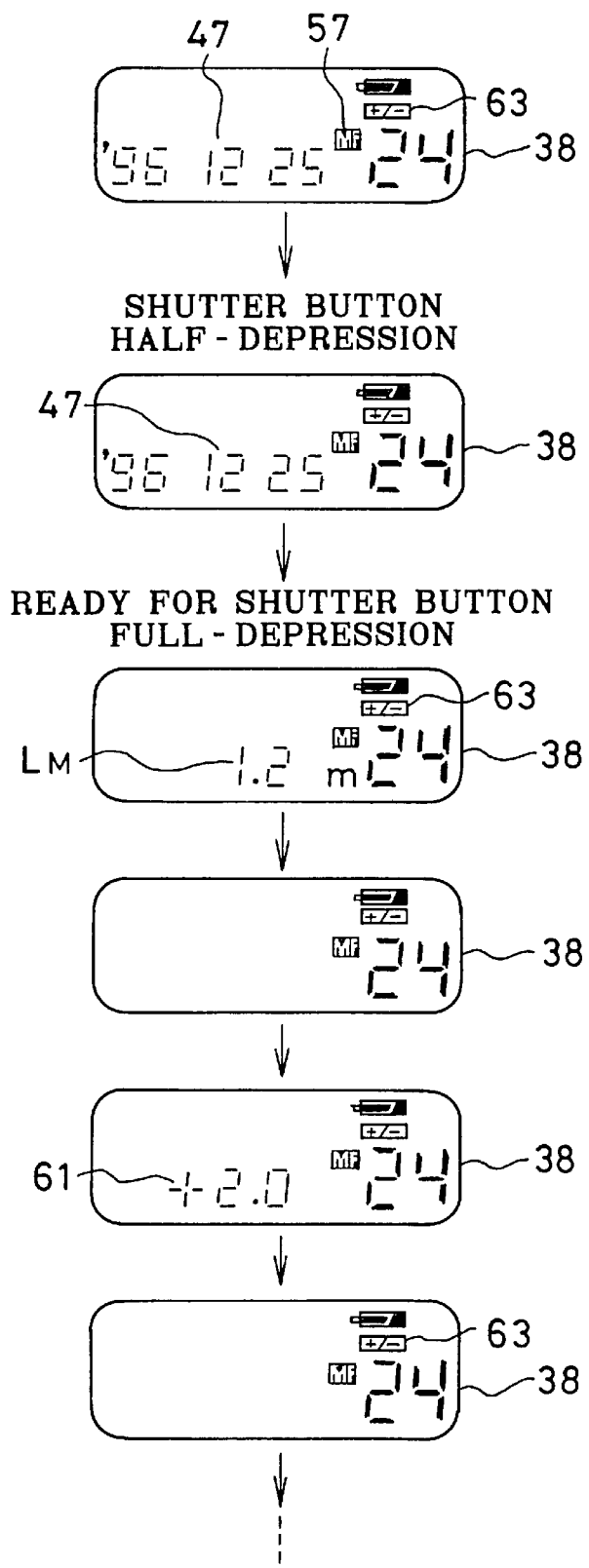
FIG. 29 is an explanatory view illustrating display conditions on the LCD panel when the shutter button is depressed halfway when both the manual focus mode and the exposure correction mode are set up.

If both the exposure correction value and the manual focus range LM are manually determined, the manual focus range LM and the modified exposure correction value 61 are displayed alternately for a limited time each, e.g. 0.5 seconds, with an intermission of 0.25 seconds therebetween, as shown in FIG. 29, so long as the shutter button 22 is depressed halfway.

If a zooming is carried out in the manual focus mode, and the manual focus range LM determined before gets out of the valid focusing range at the selected focal length, the manual focus range LM starts blinking, i.e. being displayed intermittently at 2 Hz, as shown in FIG. 30, for warning that the selected manual focus range LM is invalid and thus the aimed subject would be out-of-focus. If a second zooming or a flash charging is carried out in this out-of-focus warning condition, the manual focus range LM is replaced by the date 47 during that operation.

If the mode switch button 35 or the date switch button 39 is depressed in the out-of-focus warning condition, the date 47 takes place the manual focus range LM on the LCD panel 38, as shown in FIG. 31. Thereafter, the LCD panel 38 displays correspondingly to the selected mode. If the camera 10 is returned to the manual focus mode, and the manual focus range LM is still out of the valid focusing range, the manual focus range LM is displayed intermittently in the same way as before.

Figure 32:
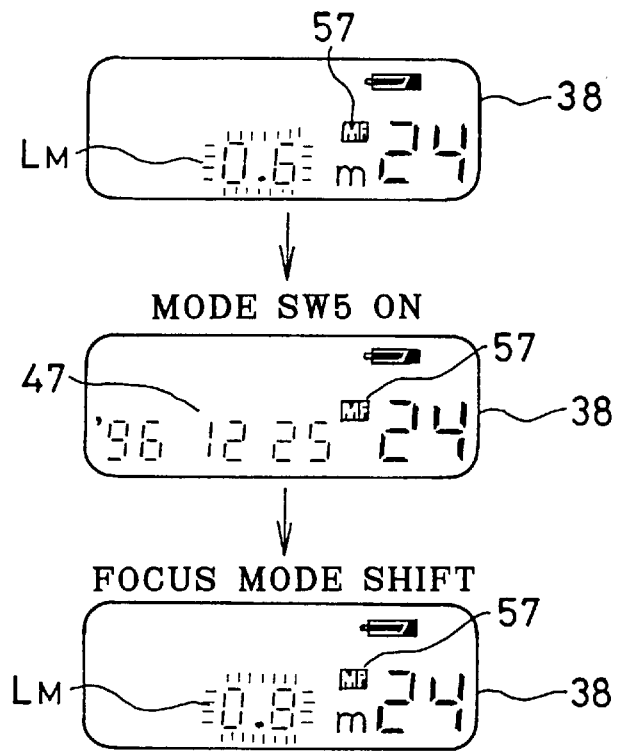
FIG. 32 is an explanatory view illustrating display conditions on the LCD panel when the mode switch is turned on and the selected manual focus range is corrected to be valid for the present focal length.

If the focus mode shifting is carried out while the mode switch button 35 is depressed in the out-of-focus warning condition, the manual focus range LM is automatically corrected to the nearest in-focus range Lz available for the present focal length, e.g. 0.8 m, as shown in FIG. 32.

Figure 33:
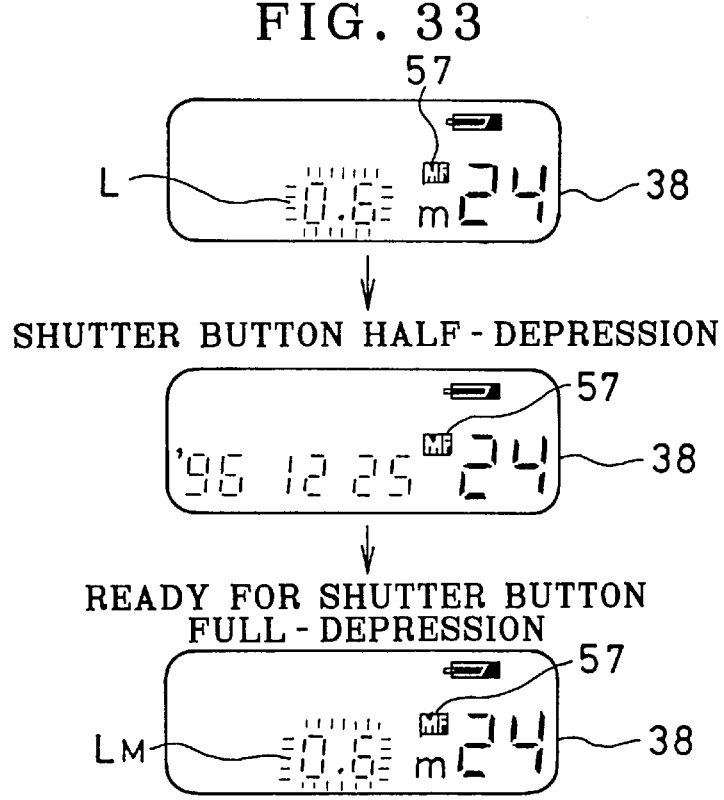
FIG. 33 is an explanatory view illustrating display conditions on the LCD panel when the shutter button is depressed halfway while the selected manual focus range is invalid for the present focal length.

If the shutter button 22 is depressed halfway in the out-of-focus warning condition, the LCD panel 38 temporarily displays the date 47 in place of the manual focus range LM, as shown in FIG. 33, and the light measurement section 19 effects the photometry for exposure control. When the camera 10 is ready for an exposure, the LED 27 starts blinking at 8 Hz for warning the manual focus range LM is invalid, while the manual focus range LM on the LCD panel 38 continues blinking at 2 Hz. Simultaneously with the shutter button 22 being further depressed to the full in this condition, the zoom lens 12 is focused on the nearest in-focus range Lz, and the LCD panel 38 displays the nearest in-focus range Lz in place of the blinking manual focus range LM.

Even if the exposure correction value is modified in the manual focus mode, if the manual focus range LM is out of focus, the out-of-focus warning is prioritized, and the modified exposure correction value 61 is not displayed.

Now, the overall operation of the camera 10 will be described.

After loading photo film, the photographer opens the lens barrier plate 13, and frames a subject through the viewfinder 17. While framing the subject, the photographer may push by the right-hand thumb the sector T1 or T2 or both to zoom the zoom lens 12 to the telephoto side, or the sector W1 or W2 or both to zoom the zoom lens 12 to the wide-angle side. The microcomputer 40 reckons an ON signal from either of the switches SW1 and SW2 as a wide-angle zooming command, and an ON signal from either of the switches SW3 and SW4 as a telephoto zooming command. Since two adjacent sectors are served as a zooming operation area for one direction, the handling facility is improved.

As shown in FIGS. 34 and 36, to set up a particular mode, the mode switch button 35 is depressed in the initial stage where the mode setting button 30 is not operated and none of the LED1 to LED4 is turned on. Responsive to the mode switch button 35 being depressed, all the LED1 to LED4 are turned on to indicate that the camera 10 moves in the mode setting standby stage. In the initial stage and the mode setting standby stage, the LCD panel 38 is in the same standard display condition, as shown for example in the top and bottom blocks of FIG. 6. Thereafter, one of the four sectors W1, W2, T1 and T2 is pushed while keeping depressing the mode switch button 35.

When the sector W1 is pushed at that time, the camera 10 moves in the focus mode setting stage. When the sector W2 is pushed at that time, the camera 10 moves in the flash mode setting stage. When the sector T1 is pushed at that time, the camera 10 moves in the exposure correction mode. When the sector T2 is pushed at that time, the camera 10 moves in the self-timer setting stage. Simultaneously with each operation on the mode setting button 30 in the mode setting standby stage, the LED1 to LED4 are turned off except one that is correspondent to the pushed sector W1, W2, T1 or T2, so that the photographer can visually confirm which sector of the mode setting button 30 is pushed. Each time the photographer pushes another sector, a corresponding one of the LED1 to LED4 is turned on, and others are turned off.

For example, when the camera 10 moves to the mode setting stage in response to one pushing of the sector W1 in the mode setting standby stage, the camera 10 is defaulted to the autofocus mode. If thereafter the sector W1 is pushed twice while keeping depressing the mode switch button 35, the camera 10 is set to the manual focus mode via the infinity focus mode. At the same time, the LCD panel 38 displays the mark 57 following a momentary display of the mark 51. Beside the mark 57, the manual focus range LM is displayed intermittently on the LCD panel 38, and also the LED2 and LED 4 start blinking, to indicate that the manual focus range LM is ready to change by depressing the sector W2 or T2.

Figure 43:
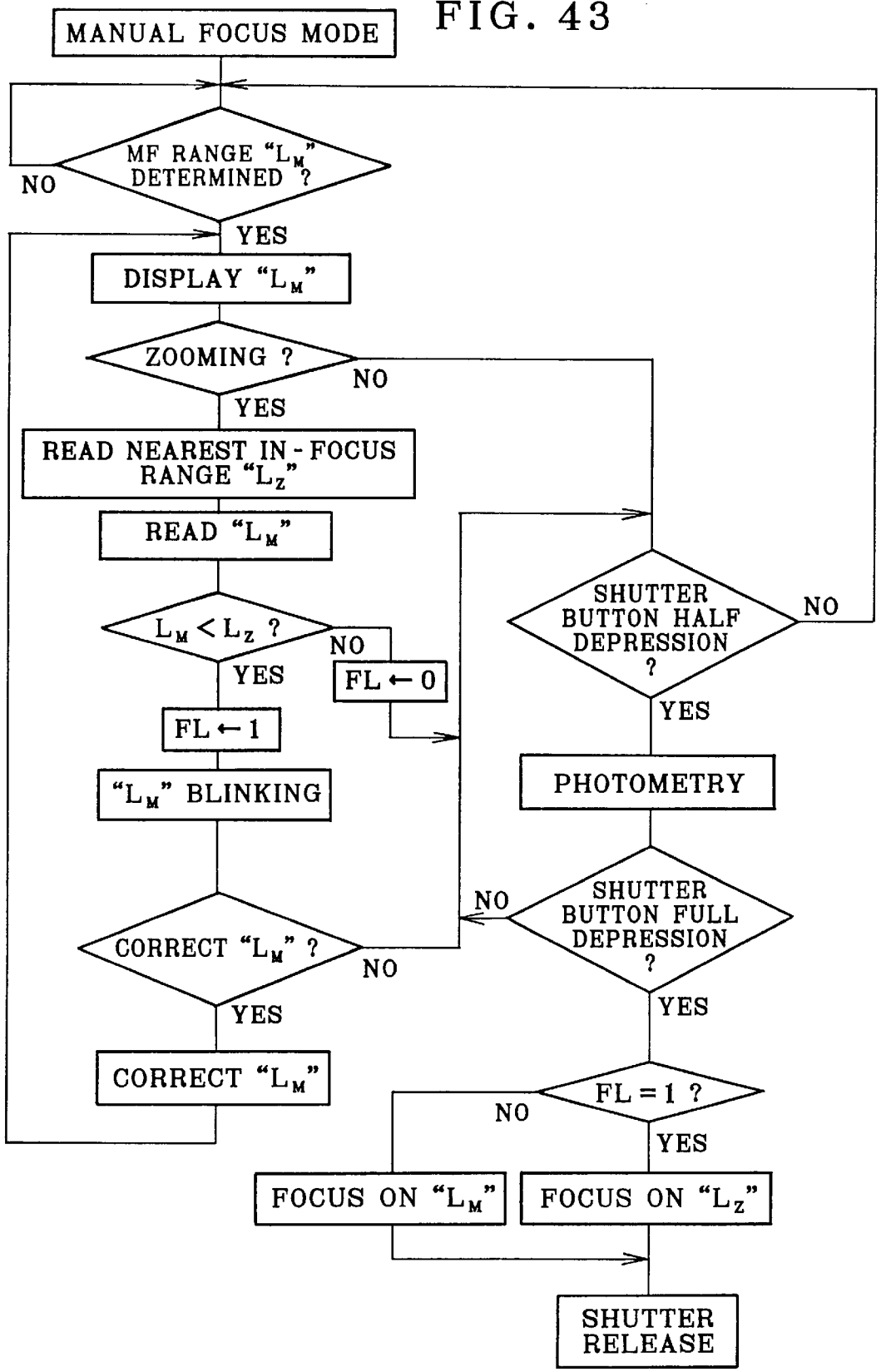
FIG. 43 is a flow chart illustrating the operation of the camera in the manual focus mode.

As shown in FIG. 43, when the photographer stop depressing the sector W2 or T2 after determining an appropriate value as the manual focus range LM, the manual focus range LM is displayed continuously on the LCD panel 38. If thereafter the zoom lens 12 is zoomed, the microcomputer 40 detects the zooming position, and reads out zooming position data in accordance with the detected zooming position from a memory location. Then the microcomputer 40 addresses another memory location by the zooming position data, to read out data of the nearest in-focus range Lz available for the present focal length represented by the zooming position data. The nearest in-focus range Lz is compared with the manual focus range LM. If the manual focus range LM is equal to or more than the nearest in-focus range Lz, the microcomputer 40 puts a flag "0". If the manual focus range LM is less than the nearest in-focus range Lz, the microcomputer 40 puts a flag "1", and causes the display of the manual focus range LM to blink, as shown in FIG. 30, for warning the photographer to correct the manual focus range LM.

If the photographer begins to correct the manual focus range LM in this warning condition, the microcomputer 40 first changes the manual focus range LM to the nearest in-focus range Lz, and then enables the correction.

When the shutter button 22 is depressed halfway in the manual focus mode, the LCD panel 38 is temporality reset to the standard condition where the manual focus range LM is not displayed but the date 47 is displayed, while the microcomputer 40 calculates a shutter speed and an aperture size based on the photometric data from the light measurement section 19. Thereafter, the LCD panel 38 displays the manual focus range LM again either in the continuous fashion if the flag is "0", or in the blinking fashion so long as the flag is "1". When the shutter button 22 is fully depressed to release the shutter while the flag is "0", the zoom lens 12 is focused on the manual focus range LM. When the shutter button 22 is fully depressed to release the shutter while the flag is "1", the zoom lens 12 is focused on the nearest in-focus range Lz.

Although the mode switch button 35 should be kept being depressed in the above embodiment, it is possible to design such that the camera 10 is latched in the mode setting standby stage once the mode switch button 35 is depressed in the initial stage, and the latest setting condition is fixed when the mode switch button 35 is depressed for the second time. At that time, the mode switch SW5 may be alternately turned on and off upon each depression of the mode switch button 35. In that case, the photographer does not have to keep pushing the mode switch button 35 during the mode setting.

Instead of displaying the manual focus range LM in the blinking fashion for the out-of-focus warning, it is possible to display a warning mark in the field of the viewfinder, or sound an alarm.

The control method for the manual focus mode according to the present invention is applicable to a zoom camera having a zoom lens whose focal length is manually changed by operating a zoom ring. In that case, the mode setting button 30 is not operated for zooming.

Figure 44:
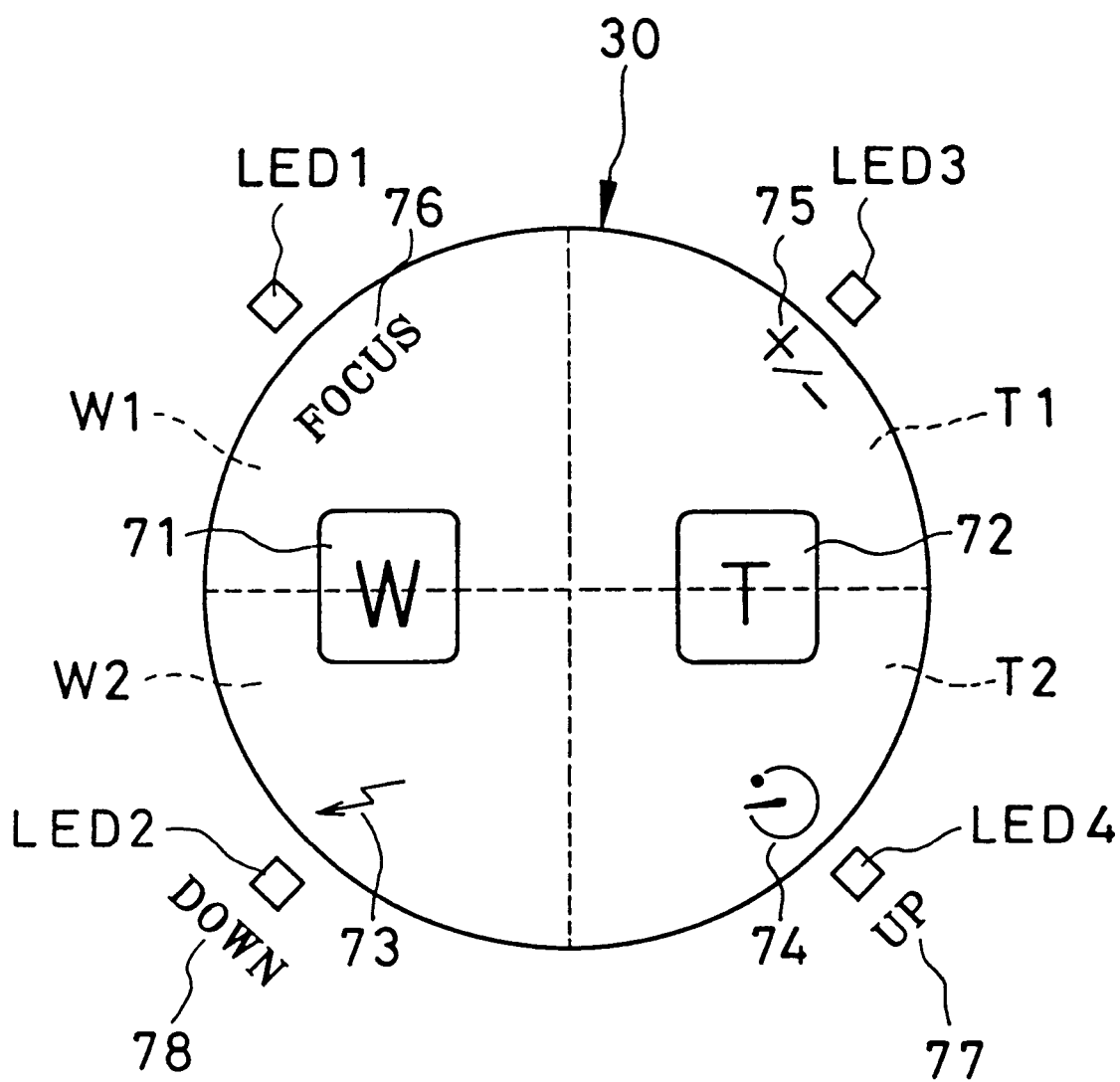
FIG. 44 is a top plan view of the mode setting button provided with indicia for indicating the respective functions of the sectors.

FIG. 44 shows a preferred embodiment of the mode setting button 30, wherein marks or indicia 71 to 78 for visually indicating the respective functions of the sectors W1, W2, T1 and T2 of the mode setting button 30 are provided on and around the mode setting button 30. The marks 71 and 72 indicate the operation area for zooming, the marks 73, 74, 75 and 76 indicate the operation areas for the flash mode setting, the self-timer setting, the exposure correction value setting, and for the focus mode setting, respectively. The marks 77 and 78 respectively indicate the operation areas for up-shifting and down-shifting setting values in each of the exposure correction mode, the manual focus mode and the date adjusting mode.

The zooming mark 71 for zooming to the wide-angle side is disposed on the border between the sectors W1 and W2, so that at least one of the switch SW1 and SW2 is actuated to output an ON signal when the photographer pushes the zooming mark 71. The zooming mark 72 for zooming to the telephoto side is disposed on the border between the sectors T1 and T2, so that at least one of the switches SW3 and SW4 is actuated to output an ON signal when the photographer pushes the zooming mark 71.

Figure 45:
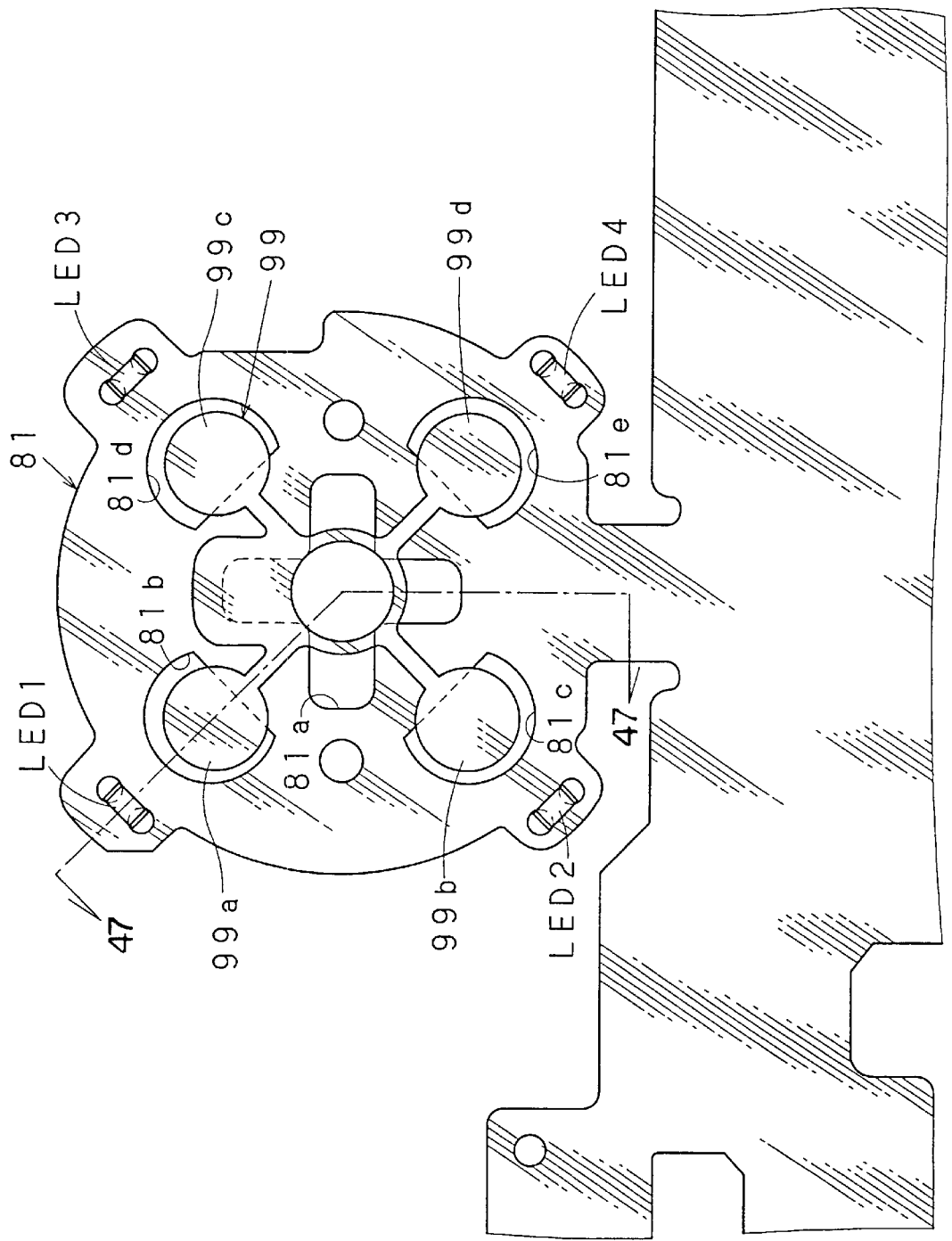
FIG. 45 is a top plan view of an isolation cover and a contact plate disposed behind a switch disc of the mode setting button.
Figure 46:
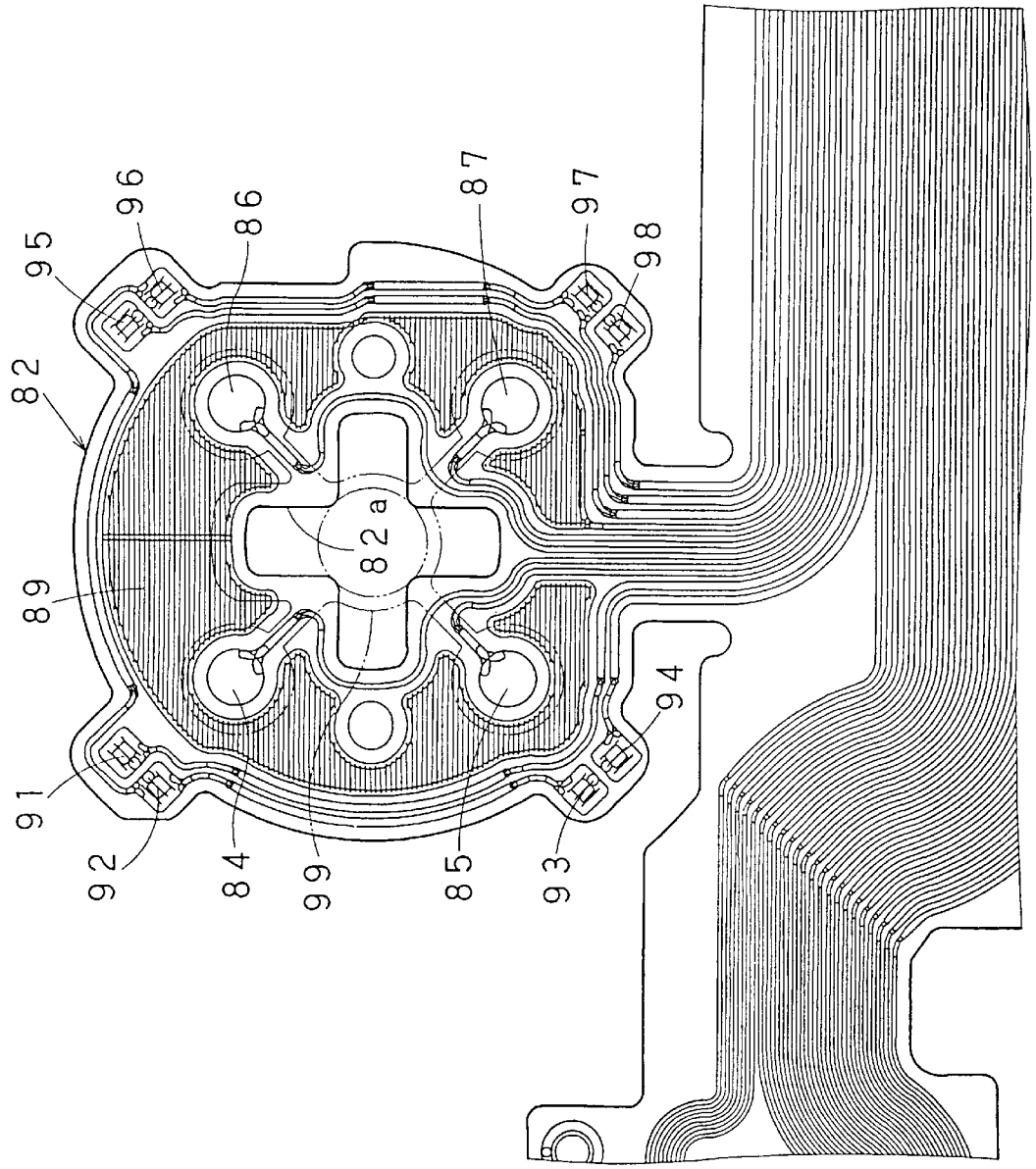
FIG. 46 is a top plan view of a printed circuit disposed behind the isolation cover.

FIGS. 45 to 48 shows an embodiment of the construction of the mode setting button 30. Behind the round switch disc 30a, an isolating resin cover layer 81 as shown in FIG. 45 is formed on a flexible substrate 82 as shown in FIG. 46. The flexible substrate 82 is provided with electrodes 84, 85, 86 and 87 in the middle areas of the four sectors W1, W2, T1 and T2. The flexible substrate 82 is also provided with four pairs of terminals 91 and 92; 93 and 94; 95 and 96; and 97 and 98 in the peripheral areas of the four sectors. The LED1 to LED4 are mounted to these four terminal pairs 91 to 98 respectively. The electrodes 84 to 87 are respectively constitute the switches SW1, SW2, SW3 and SW4, and may be bridged to a conductive portion 89 around the electrodes 84 to 87 through a contact plate 99 that is provided on the cover layer 81.

The contact plate 99 has four resilient click discs 99a, 99b, 99c and 99d which are respectively opposed to the electrodes 84 to 87, and which are connected through arms to a center portion of the contact plate 99. The click discs 99a to 99d are convex toward the round switch disc 30a such that the brims of the click discs 99a to 99d are in contact with the conductive portion 89, while the centers of the click discs 99a to 99d are ordinarily set away from the electrodes 84 to 87.

Figure 47:
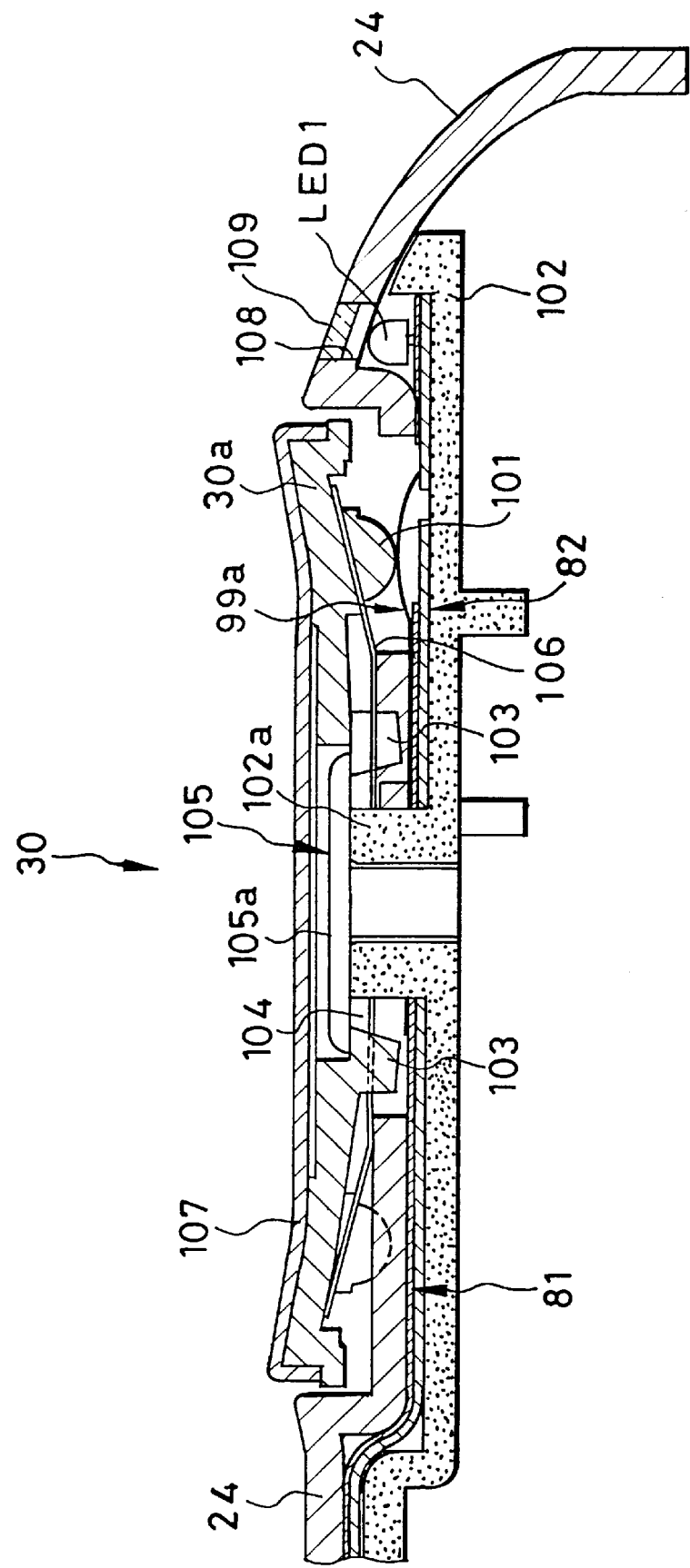
FIG. 47 is a sectional view of the mode settomg button, taken along line A—A of FIG. 45, illustrating an initial position.
Figure 48:
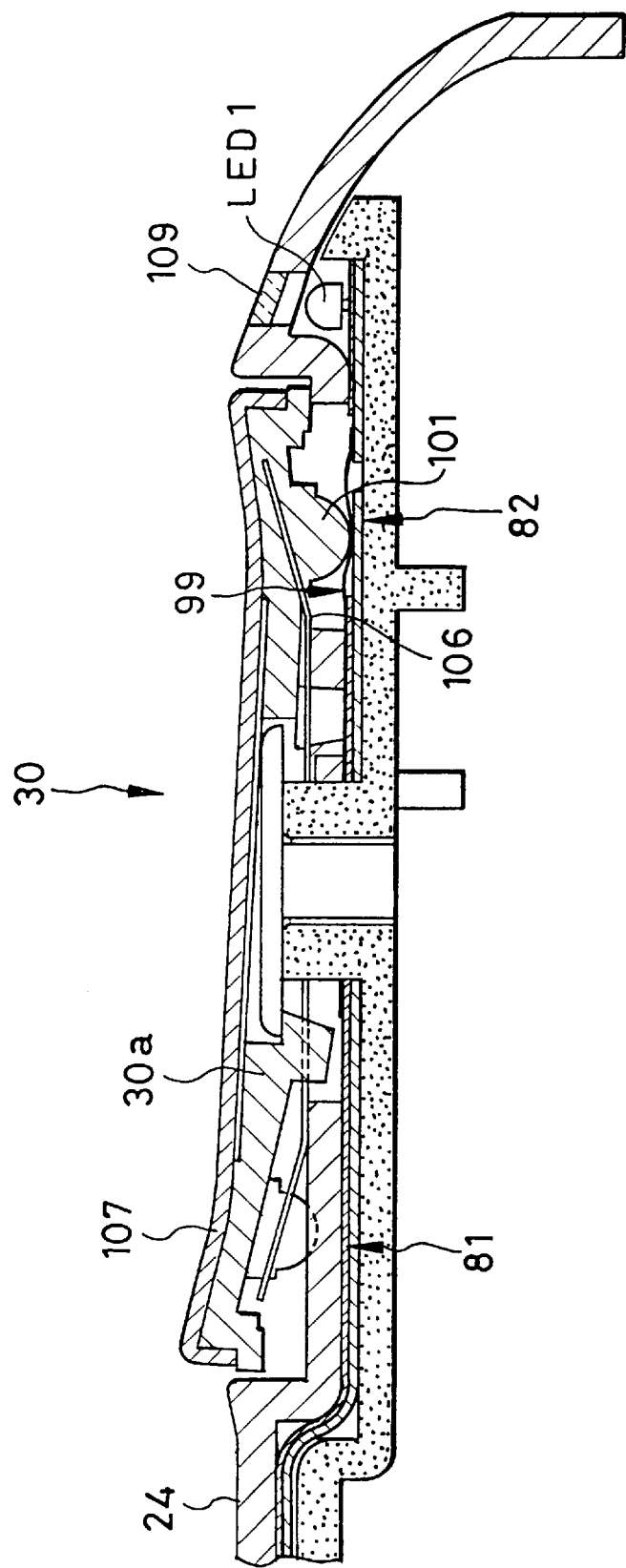
FIG. 48 is a sectional view similar to FIG. 47, but illustrating a pushed position of the mode setting button.

As shown in FIGS. 47 and 48, four protrusions 101 are formed on the back of the round switch disc 30a in opposition to the click discs 99a to 99d. When the sector W1, W2, T1 or T2 is pushed, the proturusion 101 on the back of the pushed sector depresses the opposite click disc 99a, 99b, 99c or 99d onto the electrode 84, 85, 86 or 87 respectively. On the back of the round switch disc 30a, a protuberance 103 is also formed in between the adjacent protrusions 101 in proximity to the center of the disc 30a. The protuberances 103 are for preventing simultaneous depression of more than one click disc 99a to 99d.

The switch disc 30a is fitted on a boss 102a of an inner frame 102 through a center hole 104, and is secured by a bolt or the like 105. A leaf spring 106 is provided for urging the switch disc 30a to remove away from the contact plate 99. A button cover 107 is provided over the front side of the switch disc 30a so as to conceal the bolt 105. To make the light from the LED1 to LED4 visible, small holes 108 are formed through the rear lid 24 of the camera 10 in correspondence with the LED1 to LED4. A transparent plastic plate 109, e.g. red plastic plate, is fitted in each hole 108.

Cross-like openings 81a and 82a are formed in the centers of the isolation cover layer 81 and the flexible substrate 82 respectively. Through the openings 81a and 82a, the flaxible substrate 82 with the cover layer 81 is fitted on the boss 102a. The protuberances 103 of the switch disc 30a are also inserted in the openings 81a and 82a with a clearance. In addition, four semi-circular openings 81a, 81c, 81d and 81e are formed through the cover 81 in correspondence with the click discs 99a to 99d. The LED1 to LED4 are welded to the terminals 91 to 98 through four pairs of small holes of the cover 81 which are disposed on the radially outside of the openings 81a to 81e.

When for example the sector W1 is pushed down, the switch disc 30a tilts about a point where the switch disc 30a is in contact with a bottom side surface of a head flange 105a of the bolt 105 on the opposite side of the boss 102a from the pushed sector W1. Then, the protrusion 101 on the back of the pushed sector W1 depresses the center portion of the click disc 99a resiliently onto the electrode 84 on the substrate 82. As a result, the electrode 84 is bridged to the conductive portion 89 through the click disc 99a. That is, the switch SW1 is turned on. Thereafter when the pushing on the sector W1 is terminated, the switch disc 30a leaves from the click disc 99a back to the previous position according to the urging force of the leaf spring 106, and the click disc 99a resiliently leaves from the electrode 84 back to the usual position.

Although the sectors W1 and W2 are equally used for zooming to the wide-angle side, it is possible to use the upper sector W1 for a high speed zooming to the wide-angle side, and the lower sector W2 for a low speed zooming to the wide-angle side. The same modification is possible about the sectors T1 and T2. It is also possible to use the upper two sectors for zooming in one direction, and the lower two sectors for zooming in the opposite direction.

Needless to say, the number of available modes and the types of available modes are not limited to the above embodiment. Also, the number of sectors of the mode setting button 30 can vary depending upon the number of the available modes or the number of necessary operations. The shape of the switch disc of the mode setting button is not limited to be round, but may be oval, rectangular, triangular, and so on. In that case, the mode setting button is radially or diagonally divided into sections of a corresponding shape.

a mode switch for switching the camera between a mode setting condition and a second condition;

wherein each signal from one of the switches associated with one of the sections is used for setting the camera to a different operation mode in the mode setting condition, whereas output signals from the switches of the same group serve as a same signal in the second condition.

Thus, the present invention should not be limited to the embodiments shown in the drawings, but on the contrary, various modifications may be possible to those skilled in the art without departing from the scope of claims as appended hereto.

What is claimed is:

1. A zoom camera comprising:
 a push button member having a plurality of radially divided sections;
 switches disposed in association with the radial sections, each of the switches being designed to output a signal each time the associated section is pushed; and
 a manual operation device for designating a mode setting operation, wherein the signals from the switches are used for the mode setting when the mode setting operation is designated, and for zooming when the mode setting operation is not designated.

2. A zoom camera as claimed in claim 1, wherein when the mode setting operation is not designated, any signal from predetermined adjoining two or more of the switches is used for zooming in one direction, and any signal from other adjoining two or more of the switches is used for zooming in the opposite direction.

3. A zoom camera as claimed in claim 2, wherein each of the sections is provided with a mark thereon to indicate a particular mode assigned to that section for the mode setting operation, a first mark indicating a first zooming direction being provided across those sections which are associated with those switches used for zooming in the first direction, and a second mark indicating an opposite zooming direction being provided across those sections which are associated with those switches used for zooming in the opposite direction.

4. A zoom camera as claimed in claim 3, wherein at least one of the adjoining switches outputs a signal when the push button member is pushed at the first or the second mark.

5. A zoom camera as claimed in claim 1, wherein the camera has a date printing device for merge-printing a date in a photograph, and wherein the manual operation device includes a date switch button for designating a date setting mode for setting the date and a printing format thereof.

6. A zoom camera as claimed in claim 1, further comprising optical indication members, one optical indication member being allocated to each of the sections such that the optical indication member lights in a continuous fashion or in a blinking fashion when the allocated section is pushed or expected to be pushed.

7. A zoom camera as claimed in claim 6, further comprising a display device for displaying marks indicating presently set modes, and if any, numeral values determined or to be determined in the presently set modes.

8. A zoom camera as claimed in claim 7, wherein two of the sections are respectively used for up-shifting and down-shifting the numerical value displayed on the display device in at least a specific mode that is selected by operating a different one of the sections from said two sections, each of said two sections being operated for setting a different mode from the specific mode in the mode setting operation.

9. A zoom camera as claimed in claim 8, wherein marks indicating the shifting directions are provided beside those two optical indication members which are allocated to said two sections used for shifting the numeral value, and wherein said two optical indication members start blinking to indicate that the numeral value is ready for shifting when the specific mode is selected.

10. A zoom camera as claimed in claim 1, wherein the push button member comprises a single disc virtually divided into the sections, the single disc being supported in a center thereof such that the single disc tilts in a different direction when pushed at one of the sections, and being urged by a spring force to return to a horizontal state, and wherein the switches are disposed behind the sections one by one, such that one of the switches is actuated by the tilt single disc when a corresponding one of the sections is pushed.

11. A control method for a zoom camera having a zoom lens whose nearest in-focus range varies with focal length by zooming, the method comprising the steps of:
 manually determining a focusing range which the zoom lens is expected to be focused on;
 detecting a present focal length of the zoom lens after each zooming operation;
 comparing the manually determined focusing range with a nearest in-focus range available for the present focal length of the zoom lens; and
 giving a warning if the manually determined focusing range is less than the nearest in-focus range.

12. A control method as claimed in claim 11, further comprising the step of:
   focusing the zoom lens on the nearest in-focus range when a shutter release operation is executed in spite of the warning.

13. A control method as claimed in claim 12, further comprising the steps of:
   initializing the focusing range to the nearest in-focus range in response to a manual correcting operation onto the focusing range in the warning condition; and
   thereafter permitting correcting the focusing range to a value not less than the nearest in-focus range.

14. A control method as claimed in claim 13, further comprising the steps of:
   displaying the focusing range in a continuous fashion when the focusing range as manually determined is valid for the present focal length; and
   displaying the focus range in a blinking fashion when the focusing range as manually determined is less than the nearest in-focus range.

15. A control method as claimed in claim 14, wherein the focus range is displayed in a blinking fashion also when the focusing range is ready to change, or while the focusing range is being changed.

16. A control method as claimed in claim 14, wherein the warning includes a visual warning given in or near a view finder of the zoom camera.

17. A camera comprising:
   a controller for controlling operation of the camera;
   a push button member connected to the controller and divided into a plurality of sections, each of the sections corresponding to a different operating feature of the camera and having a mark thereon indicating the corresponding operating feature;
   a mode switch connected to the controller, the mode switch being operable for putting the camera in an adjustment condition in which the operating features are adjustable; and
   a plurality of optical indication members connected to the controller, the optical indication members being equal in number to the sections of the push button member, each of the optical indication members being disposed nearest a respective one of the sections of the push button member, the optical indication members being capable of an indicating state and a non-indicating state under control of the controller;
   wherein when the camera is in the adjustment condition, at least one of the optical indication members is placed in the indicating state to indicate which of the sections of the push button member are currently available for adjusting one of the operating features.

18. The camera as claimed in claim 17, wherein after one of the operating features is selected by pushing one of the currently available sections while the camera is in the adjustment condition, only a corresponding one of the optical indication members that is disposed nearest the pushed section remains in the indicating state to indicate which of the operating features may be adjusted and a remainder of the optical indication members enter the non-indicating state, and said corresponding optical indication member remains in the indicating state after the adjustment condition is terminated.

19. A camera comprising:
   a push button member consisting of a plurality of sections, each of the sections being assigned to a different operation mode of the camera and having a mark thereon indicating the assigned operation mode;
   a mode switch operable for designating a mode setting operation; and
   optical indication members allocated in one-to-one relationship to the sections of the push button member, wherein when the mode setting operation is designated by the mode switch, the optical indication members selectively go on to indicate those sections of the push button member which are presently effective on the mode setting, and the camera is switched to one operation mode by pressing one of the presently effective sections that is assigned to said one operation mode;
   wherein when an operation mode is selected in the mode setting operation by pushing one of the presently effective sections, only one of the optical indication members that is allocated to the pressed section continues to light for indicating the selected mode, whereas other optical indication members go off, and said only one optical indication member continues to indicate the selected mode after the mode setting operation is terminated;
   wherein the indication members are located around a periphery of the push button member nearby the marks on the individual sections; and
   wherein two of the sections of the first push button member double as operation members for setting up a numerical value in at least a predetermined mode to which neither of said two sections are assigned, the numerical value being up-shifted or down-shifted by pressing one or the other of said two sections respectively, and wherein marks or indicia for indicating the shifting directions of the numerical value are provided adjacent to the indication members of said two sections.

20. A camera as claimed in claim 19, wherein the indication members of said two sections blink to indicate that said two sections are ready for setting up the numerical value.

21. A camera as claimed in claim 20, wherein the push button member is radially divided into a least three sections.

22. A camera as claimed in claim 20, wherein the push button member comprises:
   a single disc virtually divided into the sections; and
   a plurality of switches associated in one-to-one relationship with the sections, one of the switches being turned on by pushing an associated one of the sections.

23. A camera as claimed in claim 20, wherein the sections of the push button member are separate push buttons which are arranged adjacent to one another, and are pressable individually.

24. A camera as claimed in claim 20, wherein the mode switch is a push button switch which designates the mode setting operation so long as it is pressed, and terminates the mode setting operation when it is released.

25. A camera as claimed in claim 20, wherein the mode switch is a push button switch which designates the mode setting operation when pressed once, and terminates the mode setting operation when pressed again.

26. A camera comprising:
   a push button member divided into at least three sections;
   a switch associated with each of said at least three sections, each said switch being able to output a signal each time the associated one section is pressed; and
   a mode switch for switching the camera between a mode setting condition and a second condition;

wherein, in the mode setting condition, each signal from one of the switches associated with one of the sections is usable for adjusting an operating feature of the camera which differs from operating features adjustable by a remainder of the signals, and wherein, in the second condition, all of the output signals from the switches associated with the sections serve an identical single function.

27. A camera comprising:

a push button member comprising at least four sections;

a switch associated with each of said at least four sections, each switch being able to output a signal each time the associated one section is pressed, said at least four switches being grouped into two groups, each said group comprising more than one switch; and a mode switch for switching the camera between a mode setting condition and a second condition;

wherein, in the mode setting condition, each signal from one of the switches associated with one of the sections is usable for adjusting an operating feature of the camera which differs from operating features adjustable by a remainder of the signals, and wherein, in the second condition, output signals from the switches within a same group serve an identical single function.

* * * * *

UNITED STATES PATENT AND TRADEMARK OFFICE
CERTIFICATE OF CORRECTION

PATENT NO. : 5,970,261

DATED : October 19, 1999

INVENTOR(S) : Minoru Ishiguro, et. al.

Figure 49:
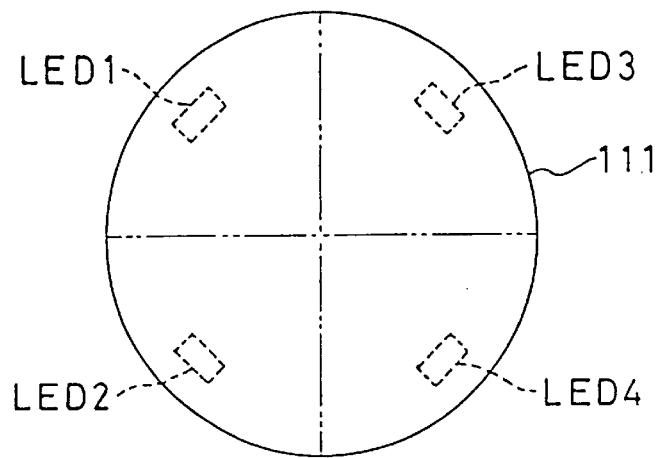
FIG. 49 is a top plan view of the mode setting button with LEDs disposed behind the sections.

It is certified that error appears in the above-identified patent and that said Letters Patent is hereby corrected as shown below:

Column 15, lines 39-47, rewrite as follows:

--Although the LED1 to LED4 are arranged around the mode setting button 30 in the above embodiment, it is possible to dispose one LED or another kind of light emitting element behind each section of the mode setting button, as shown in Fig. 49, while forming a switch disc 111 from a transparent or semi-transparent material.

Figure 50:
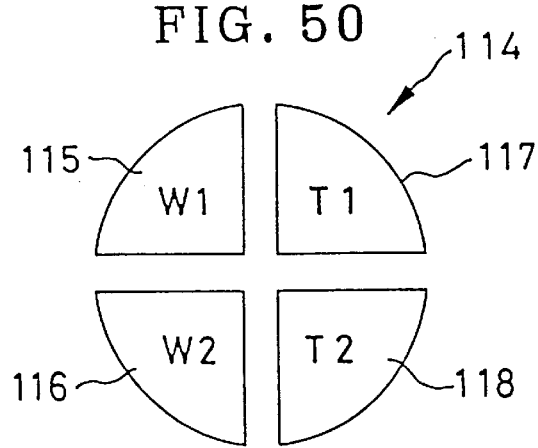
FIG. 50 is a top plan view of the mode setting button divided into four separate buttons.
Figure 51:
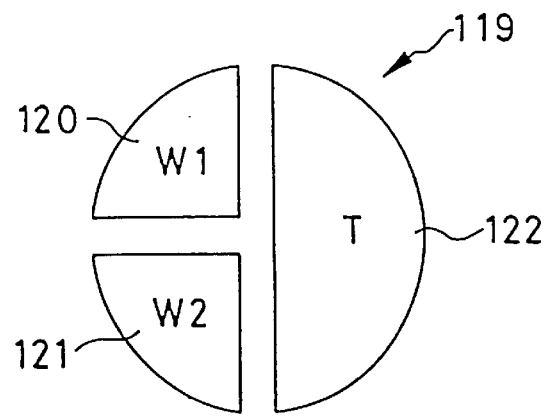
FIG. 51 is a top plan view of the mode setting button divided into three separate buttons.

It is also possible to construct each section of the mode setting button as a separate member, and arrange these separate members adjacent to one another, as shown in Figs. 50 and 51. In Fig. 50, a mode setting device 114 is constituted of four push buttons 115, 116, 117 and 118. In Fig. 51, a mode setting device 119 is constituted of three push buttons 120, 121, and 122. It is possible to virtually divide the push button 122 into two sections by positioning two switches behind the push

UNITED STATES PATENT AND TRADEMARK OFFICE
CERTIFICATE OF CORRECTION

Page 2 of 2

PATENT NO. : 5,970,261
DATED : October 19, 1999
INVENTOR(S) : Minoru Ishiguro, et. al.

It is certified that error appears in the above-identified patent and that said Letters Patent is hereby corrected as shown below:

button 122. Also in the embodiments shown in Figs. 50 and 51, an optical indication member is allocated to each push button in the same way as shown in Fig. 2, or as shown in Fig. 49.

It is possible to provide a particular operation mode wherein signals from the switches SW1 to SW4 serve as the same signal. For example, the focus of the camera is locked in response to the signal from any of the switches SW1 to SW4 in that mode.

Although the present invention has been described with respect to those zoom cameras whose zooming position is changed by use of an electric motor or actuator, the mode set up device of the present invention is applicable to a manual zoom camera and any other types of cameras. In that case, a wide variety of modes are made available through the operation of the mode setting button and the mode switch in combination.--

Signed and Sealed this

Twenty-fourth Day of October, 2000

*Attest:*

Q. TODD DICKINSON

*Attesting Officer*     *Director of Patents and Trademarks*